United States Patent
Holly et al.

(10) Patent No.: US 9,763,386 B2
(45) Date of Patent: Sep. 19, 2017

(54) SUGAR CROP HARVESTER

(71) Applicants: Stephen Michael Holly, Crosslake, MN (US); Jon Bradley Hochalter, Stillwater, MN (US)

(72) Inventors: Stephen Michael Holly, Crosslake, MN (US); Jon Bradley Hochalter, Stillwater, MN (US)

(*) Notice: Subject to any disclaimer, the term of this patent is extended or adjusted under 35 U.S.C. 154(b) by 0 days.

(21) Appl. No.: 14/281,879

(22) Filed: May 19, 2014

(65) Prior Publication Data
US 2016/0316625 A1 Nov. 3, 2016

Related U.S. Application Data

(60) Provisional application No. 61/824,365, filed on Jul. 9, 2013.

(51) Int. Cl.
*A01D 45/10* (2006.01)
*A01D 45/00* (2006.01)

(52) U.S. Cl.
CPC .......... *A01D 45/003* (2013.01); *A01D 45/10* (2013.01)

(58) Field of Classification Search
CPC .... A01D 45/003; A01D 45/10; A01D 43/082; A01D 43/006; A01D 47/00
USPC ....... 56/12.8, 13.9, 14.3, 62, 63, 70; 460/70, 460/134
See application file for complete search history.

(56) References Cited

U.S. PATENT DOCUMENTS

| | | | | |
|---|---|---|---|---|
| 3,946,875 A * | 3/1976 | Fowler | ...................... | B07B 4/06 209/134 |
| 4,039,434 A * | 8/1977 | Croucher | ............... | A01D 45/10 209/28 |
| 4,098,060 A * | 7/1978 | Quick | .................... | A01D 45/10 56/13.9 |
| 5,463,856 A * | 11/1995 | Beckwith | ............... | A01D 45/10 460/134 |
| 5,816,036 A * | 10/1998 | Caillouet | ............... | A01D 45/10 56/14.3 |
| 6,869,356 B2 * | 3/2005 | Hinds | .................... | A01D 45/10 460/70 |
| 7,469,632 B1 * | 12/2008 | McClune | ............. | A01D 43/006 100/121 |
| 7,805,916 B2 * | 10/2010 | Hinds | .................. | A01D 45/003 56/62 |
| 8,220,236 B1 * | 7/2012 | Benner | ................ | A01D 45/003 56/63 |
| 8,984,850 B2 * | 3/2015 | Lawson | ............... | A01D 45/003 56/13.9 |
| 9,119,346 B2 * | 9/2015 | Vergote | .................. | A01D 45/10 |

* cited by examiner

*Primary Examiner* — Robert Pezzuto

(57) ABSTRACT

A machine for harvesting sugar-bearing ground crops such as sweet sorghum, in cold regions is described. The sugar crop harvester with various adaptations described is comprised of operational components, or features, that minimize the damage done to the crop during harvesting, particularly those things that result in deterioration of sugars prior to processing. The harvester includes several operational components that are well suited for processing sweet sorghum, particularly the dividers, base cutters, feed conveyor, detrashing roll, brush rolls, hurler drums, de-bridging thrash roller, air blast, toppers and bin. Other components of the harvester are designed for easy maintenance. The operational components can be used with either a whole-stalk style harvester, or a chopper-style harvester.

4 Claims, 45 Drawing Sheets

SUGAR CROP HARVESTER

CROSS-REFERENCE TO RELATED APPLICATION

This application claims the benefit of U.S. Provisional Application No. 61/824,365 filed on 17 May 2013, the contents of which are incorporated herein by reference. A claim of priority is made.

FIELD OF THE INVENTION

The present invention relates to an apparatus for harvesting sugar crops. More particularly, the present invention relates to an apparatus for harvesting sweet sorghum in a form required for cold weather storage of sugars in commercially useful piles.

BACKGROUND OF THE INVENTION

Nations seek to produce biofuels and biochemicals from farm crops for economic, environmental and national security reasons. Sugar cane is currently the world's lowest-cost raw material for the production of biomass energy and biochemicals. The crop can produce high yields of sugar and fiber at relatively low agricultural costs. However, sugar cane cannot be rotated with food crops or even grown in many areas of the world, including those with degraded, infertile land or arid lands with low rainfall or with short growing and harvesting seasons (less than 180 days). Nations want to use these lands in way that doesn't compete with food crops.

Many nations could potentially use a similar, but lower input, cane sugar crop called sweet sorghum, which can grow on arid, saline and alkaline soils in about 120 days. Compared to sugar cane, sweet sorghum can produce nearly as much sugar and fiber with lower agricultural costs, including seeds, nitrogen fertilizer, water and land. However, pest problems can make it difficult to grow sweet sorghum in southern areas with long growing and harvesting seasons. Generally pests don't pose significant problems in colder, northern regions.

The overall problem in colder, northern regions is the production of various products from sweet sorghum is not cost-competitive when the crop must be hauled to the plant and processed only during the short harvest season. The solution is to delay deterioration of the sugars by storing the crop as a de-leafed whole plant in the cold weather near local farms to extend the hauling and process season over the winter (like accomplished by the sugar beet industry).

The storage of sugar crops depends on providing conditions that allow the crop to live at low metabolism. Sugar losses are caused by normal respiration as the stalks use sugar as an energy source at above freezing temperatures. Sugar crops respire and deteriorate more rapidly under several conditions, including: when damaged by disease or insects during growth; when burned; if the crop is cut or bruised during mechanical harvesting; if the crop is subjected to elevated temperatures above freezing; or by an accumulation of environmental or climatic effects including heat, sunlight and alternating frosts and thaws.

As practiced on a commercial scale by the sugar beet industry, storage of sugars within sugar beets outside during cold weather requires harvest as a whole plant with minimal damage in order to slow deterioration over the winter. In addition, leaf removal is also likely necessary to allow circulation of air within large commercial piles of the crop to prevent over-heating from excessive fermentation. Piles are typically sealed on the outside with hay or plastic. Poor ventilation or desiccation reduces the oxygen content in piles causing fermentation, decay and sugar loss. For successful commercial storage of sweet sorghum sugars, a harvesting system must be able to strip the leaves with minimal stalk damage.

The large surface area of the sweet sorghum leaves means pile ventilation will be blocked. Moreover, it would be preferable to reject most of the leaves back onto the land as soil conditioner and also to get them out of the way for piling and later milling. But the storage methodology practiced by the sugar beet industry, which requires removal of virtually all leaf matter back to the soil, cannot be assumed to be most effective for sweet sorghum. Stalks pile with less density and greater amount of air spaces than beets. It is unknown whether some leaves should be used to slow the air flow or if bigger piles are needed with better sealing when temperatures are cold and about to warm. At least initially, a wide range of leaf removal is preferable until sufficient data can be obtained through testing of large piles under actual variable weather conditions to determine how much leaf removal is optimal for commercial storage of sweet sorghum.

Sugar loss increases with cutting. N.J. King in Producers' Review 1972, 62, (7), 66-67 reported for sugar cane: "While full-length (6-ft) cane stalks with two cut ends dry out rapidly, the same stalks, when passed through a chopper harvester, will be cut into six 12 inch billets having a total of 12 ends which do not dry rapidly because of the protection afforded by surrounding billets. The result is faster deterioration than in the case of the 6-ft stalks, the rate increasing with reduction in billet size, short billets also splitting more easily than long ones and thus being susceptible to attacks by bacteria."

Unfortunately, commercial harvesting systems for sweet sorghum are not currently available that can strip the leaves from stalks with minimal damage. Sweet sorghum can be harvested, handled and processed with equipment used for sugar cane (since both are similarly-shaped cane sugar crops). But commercial sugar cane harvesters, including both choppers and soldiers, are also not designed to strip the leaves with minimal damage even though it would be advantageous. Nor is there commercial equipment available for either pre-harvest or post-harvest that could strip the leaves from stalks of either sweet sorghum or sugar cane with minimal damage.

Commercial chopper (billet) harvesters are used by most commercial sugar cane operations and are also proposed by most sweet sorghum projects, especially those in warmer southern climates. Sugar cane chopper harvesters can strip the leaves to the farm field, handle fairly narrow rows and recover lodged stalks, but the chopping into billets damages the stalks far too much for long-term storage in colder northern climates.

Commercial soldier (whole stalk) harvesters can harvest sugar cane stalks with little damage, even though the chains on which the stalks ride may cause excessive damage. But commercial soldier harvesters are being phased out for use with sugar cane and also have little use for sweet sorghum, because these whole stalk harvesters cannot strip the leaves, and thus require burning of the leaves in the field, which may be prohibited in some areas. Burning also causes infections and loss of sugars. Moreover, crop yields cannot be maximized because the harvesters cannot handle narrow row spacing or harvest lodged stalks fallen by heavy crop weights.

Some researchers have proposed pre-harvest leaf removal using high-boys, driven above the crop with the wheels between the rows, and equipped with circulating rubber finger strippers that beat the leaves off the stalks from both sugar cane and sweet sorghum stalks standing in the field. But these machines cannot remove leaves from lodged stalks and appear to considerably damage the stalks; while the rubber strippers wear out too quickly for commercial use. Some commercial sugar cane operations, especially in Cuba, use stationary sugar cane cleaning tables that can strip leaves, but this requires cutting, and thus damaging, the stalks.

A few sugar cane prototype harvesters have been built to harvest whole stalks of sugar cane with minimal damage while stripping the leaves. Such harvesters also tend to be designed for the stalks to ride on a conveyor, instead of chains, to minimize stalk damage and also to harvest narrow rows and lodged stalks. But these prototype sugar cane harvesters have not been fully developed for commercial harvesting of sugar cane, and until now, have not been modified for, or tested on, sweet sorghum.

Besides the essential need to strip the leaves with minimal damage, modification of sugar cane harvesters for use with sweet sorghum must also address some crop differences. For example, sweet sorghums often have more numerous, thinner and softer stalks, less numerous and shorter leaves, and grain heads, compared to sugar cane. The present invention provides a solution to these needs and other problems, and offers other advantages over the prior art.

Research has indicated that very low sugar losses may be had within one meter high piles of de-leafed and whole sweet sorghum stalks stored outdoors on a farm field in southern Minnesota during the winter. In order to provide for optimal storage and processing conditions with the least amount of sugar deterioration, sorghum should be de-leafed in the field, with minimal damage to the stalk, prior to transport to processing plants. This invention solves this, and other, problems and provides advantages over the prior art.

The specific problem addressed by these inventive changes is the lack of a harvester that can economically deliver sweet sorghum as de-leafed and undamaged whole stalks required for storage of the crop in climates with cold winters, while also meeting other requirements including the minimization of manual labor through economy-of-scale and mechanization, and also yield maximization through the harvesting of narrow rows (30 to 40 inches), cutting the stalks at ground level and recovering fallen stalks.

The proposed solution is to modify a harvester that has been designed to meet these requirements for the somewhat similar crop sugar cane (whose sugars can also be stored albeit for shorter periods in warmer climates), and these modifications represent the novelty of the invention.

BRIEF SUMMARY OF THE INVENTION

The apparatus disclosed herein solves the significant problems related to harvesting that currently prevent the commercialization of the agricultural crop sweet sorghum in northern regions. The presently described harvester apparatus can reduce or substantially eliminate at least some of the following, for example:

(1) the problem of sugar deterioration during storage is slowed by harvesting whole stalks with minimal damage;

(2) the problem of increased sugar deterioration during harvesting and storage is slowed by preventing damage from shattering when cutting the stalks at ground level;

(3) the problem of increased sugar deterioration in large commercial storage piles is slowed by using the harvester to strip (clean) the leaves and blow them back onto the farm land (without burning);

(4) the problem of lower food yields on crop land is reduced by topping and collecting the grain-heads for feed by-product;

(5) the problem of reduced crop yields during planting is solved by harvesting rows as narrow as 30 inches (compared to wider spacing for sugar cane);

(6) the problem of crop yield loss during harvesting is solved by cutting the stalks at ground level (noting that the largest diameter and yield of the stalks is at the bottom of the stalks), recovering over 95% of the stalks, collecting at least 90 percent of lodged cane and pile the cane for loading of at least 98% of the cane;

(7) the problem of uneconomical harvesting is solved by achieving harvest rates of 30 to 100 tons per hour, and capital costs, fuel and maintenance should be comparable to chopper harvesters; and (8) the problem of manual labor is solved by totally mechanized harvesting.

The design specifications proposed for sweet sorghum harvesters were developed and demonstrated to design and build specific equipment. Development was based on modification of technology established with prototype and commercial sugar cane harvesters, with special consideration for the need to harvest the crop in the form required for cold weather storage of sugars in commercial piles like that practiced with sugar beets. Harvesters used for sugar cane can best serve as the design basis since both crops are tall, high-yielding, leafy cane crops with a tendency to lodge and have similar uses. It is important to use experiences gained with sugar cane since it has proved to be the most difficult crop to machine harvest.

A sweet sorghum harvester may be designed and built by selecting and modifying a prototype whole stalk sugar cane harvester, such as the popular Centurion harvester, or a chopper (billet) harvester such as the Ausoft. The selection may be based on the harvester's design to harvests whole stalks with minimal damage while stripping the leaves, harvesting narrow rows, recovering 96% of the stalks, collecting lodged cane, and achieving rates of 30 tons per hour with total mechanization.

The elemental designs are intended to meet product specifications required to solve the problems related to the harvesting of sweet sorghum in northern regions. The sugar deterioration problem caused by shattering when cutting the stalks at ground level is solved by novel base cutters. The problem of sugar deterioration during storage caused by the blockage of pile ventilation by leaves is solved by a leaf stripping mechanism. The reduced food yield problem, caused by the lack of a collection system for the topped grainheads, is solved by dividing the bin for collection. Other miscellaneous harvesting problems caused by the use of a harvester for sweet sorghum that is set for sugar cane are solved by various simple modifications as described below.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 63 shows mounted cross-tube in the main axel beam area.

DETAILED DESCRIPTION

The harvester disclosed herein may be based on a whole stalk harvester apparatus, a chopper harvester apparatus, or the like. The elements of the design modifications are discussed in terms of modifications to a whole stalk harvester, but are equally applicable to the chopper type as well. The design of the various elements often requires delicate balancing; they are inextricably intertwined and often opposing. The modifications discussed below represent components developed for a preferred embodiment of a sweet sorghum harvester.

Figure 1:
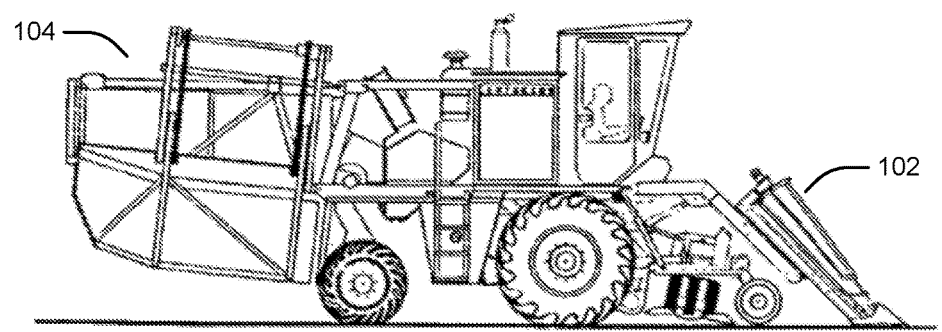
FIG. 1 illustrates a prototype whole-stalk sugar cane harvester.
Figure 2:
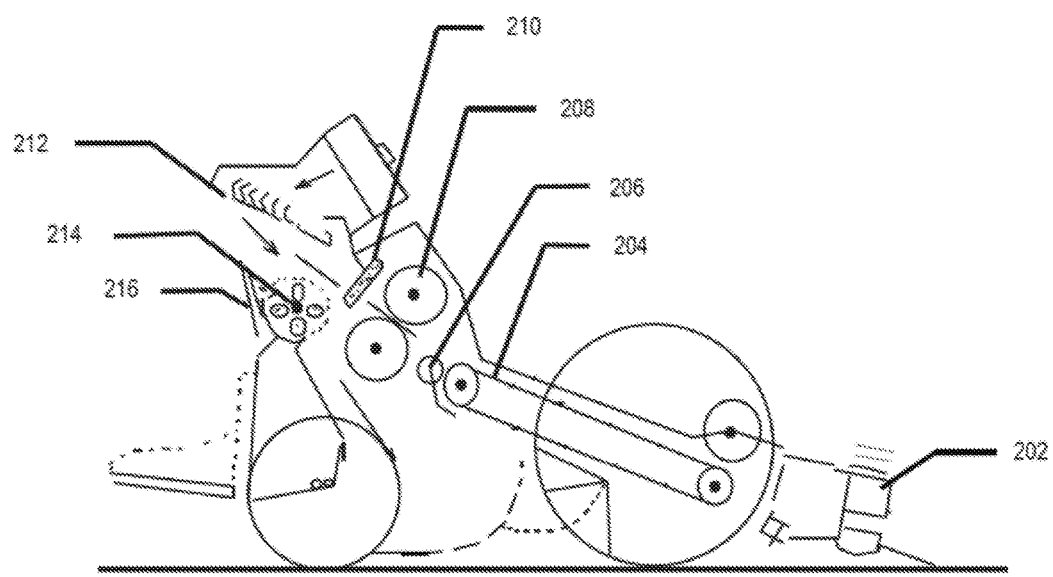
FIG. 2 provides another view of a whole stalk harvester showing additional details.

FIGS. 1 and 2 illustrate a prototype whole-stalk sugar cane harvester designed to harvest whole stalks of sugar cane with minimal damage while stripping the leaves, handling narrow rows and harvesting even lodged stalks. Referring to FIG. 1, dividers 102 at the front of the harvester gather cane in the row and separate it from cane in adjoining rows. The bin 104 in the rear accumulates and discharges cane into piles. FIG. 2 shows additional detail of harvester components. Base-cutters 202 sever the cane at ground level. A feed conveyor 204 carries the cane through the machine. A de-trashing roll 206 removes free trash including leaves. Hurler drums 208 pull cane from the conveyor and throw it into the bin. Rubber comb fingers 210 catch as many of the leaves as possible. A flail rotor 214 ejects trash caught by comb fingers and an air blast 212. The air blast 212, directed against cane flow and downwards towards the flail, separates trash from cane. A topper 216, including a pair of sharp-toothed discs rotating outwards against ledger plates, severs the tops of the cane to length.

As shown in FIG. 2, the harvester cuts 202 the cane at the base but improvements are always sought to reduce machine wear and extraneous matter. The design of the conveyor 204 requires finding the right compromise between an aggressive feed, which damages cane, and a kinder feed, which can lead to chokes in the throat. The hurler drum 208 requires the right combination of resilience and wear resistance while making replacement as cheap as possible. The harvester's topping device 216 is optimized for clean removal of seed head tops, while minimizing stalk losses and damage. The harvester bin 104 is optimized to neatly accumulate an optimal-size bundle of stalks for loading, dump the bundles in neat piles onto the ground (clear of trash) for collection by the loaders, and discharge the bundles away from the machine and the path of the machine during subsequent passes on the field. Further reductions in extraneous matter are expected to come mainly from improvements in trash scrape and loading methods.

In an exemplary embodiment, the production rate of the machine might achieve an objective pour rate of 0.75 to 1 tons per minute in green cane (or a forward speed of 3.75 kilometers per hour in 80 ton per hectare stalks planted at 1.5 meter row spacing). A harvester may be fitted with an engine providing 165 horsepower (123 kilowatts) gross output. A harvester engine may drive a 3-outlet splitter box with connected hydro-pump, steering pump and two tandem gear pumps. The hydraulic drive, hydrostatic vehicle transmission, 4-wheel drive and variable displacement motors may be equipped with high and low speed ranges. An exemplary harvester may have 15 hydraulic motors of the orbital type including those for cleaning and oil cooler fans. The consumption of power is mainly by the various harvesting operations including the base cutter and dividers, but also for traction, the cleaning fan and engine auxiliaries. In addition, there are pump, circuit, motor and other losses. Moreover, the motors should have ample back-up torque to cope with sudden overloads.

A harvester further optimized for field performance and stability has rear-steer configuration to get maximum maneuverability and satisfactory axle load distribution for the long length needed to handle whole-stalks of cane going through it horizontally. A wheelbase of dimensions similar to a tractor (approximately 2.3 meters), provides a tight turning circle for headlands. A base cutter and divider can be lifted up high at the end of a row, to give a 20 degree clearance angle. There may be even more clearance at the back, when the bin doors have been raised. In an exemplary embodiment, the working limit for side-slope is 15 degrees.

A preferred embodiment of a harvester modified to optimize the conditions of harvested stalk for processing includes at least one of the following harvester components:
Dividers,
Base-cutters,
Feed conveyor,
De-thrashing roll,
Brush rolls,
Hurler drums,
De-bridging thrash roller,
Air blast,
Toppers, or
Bin. Each will be discussed in turn.

Dividers

Figure 3:
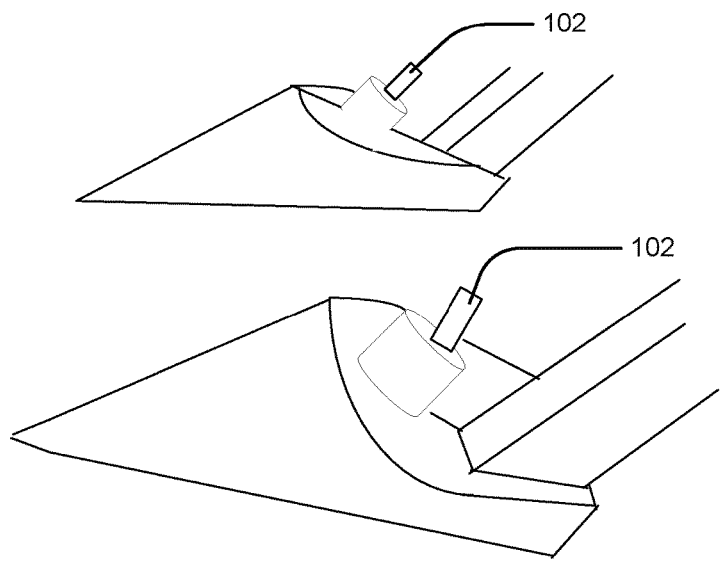
FIG. 3 illustrates crop dividers which may be located at the front end of a harvester.

Two dividers may be located at the front of the harvester 102 (FIGS. 1 and 3). Dividers are used to capture the stalks to be harvested and deflect to the side anything outside the capture area. Modification is usually needed because the dividers used for sugar cane harvesters have been designed for harvesting rows of one to two meters. In order to allow for narrow rows and higher yields, an optimal set of dividers may be spaced to accept dual crop rows of at most 30 inches apart.

Base Cutters

Base cutters sever the stalks at ground level and lift them into the throat. The stalks of relatively large-diameter and fibrous crops like sugarcane, sorghum, and coppiced trees are already cut mechanically with rotating discs onto which sharp-edged blades are attached. Both single disc cutters and twin (counter-rotating) disc-cutters are in use, typically spinning with a blade-tip speed of 3-6,000 ft per minute. A variant of the disc cutter is to have notches cut in the rim of a circular disc and not to use detachable blades.

If the cutting device is forming the front of a "combine" sugarcane harvester, the counter-rotating discs also act as the gathering mechanism, pushing the cut stalks rearwards into a conveying mechanism. To make this rearward movement more positive it is typical to have one or more horizontal rollers over the twin discs.

Figure 4:
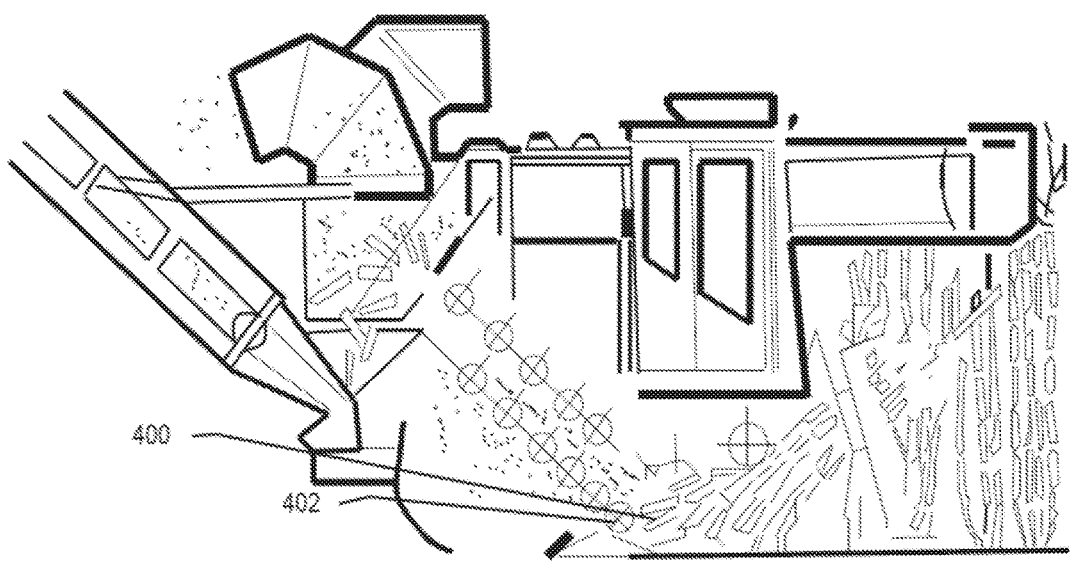
FIG. 4 illustrates an exemplary harvester with inclined base cutters.

If the discs are running parallel to the ground, the disc, and structures on the disc that hold the detachable blades, experience considerable friction. FIG. 4 illustrates how twin disc cutters may be run at an appropriate angle to the ground to minimize power consumption in a typical sugar cane harvester. To reduce the consequent power consumption of these cutting devices to acceptable levels, they may be run in an inclined manner 400. The horizontal feed roller is situated over the base cutter 402.

Figure 5A:
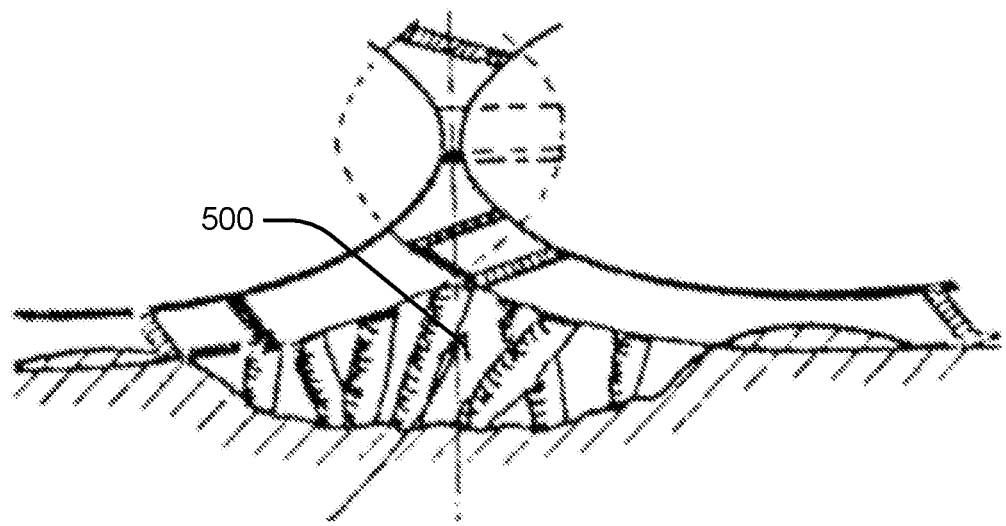
FIGS. 5a and 5b illustrate how inclined base cutter discs the stalk at the base.
Figure 5B:
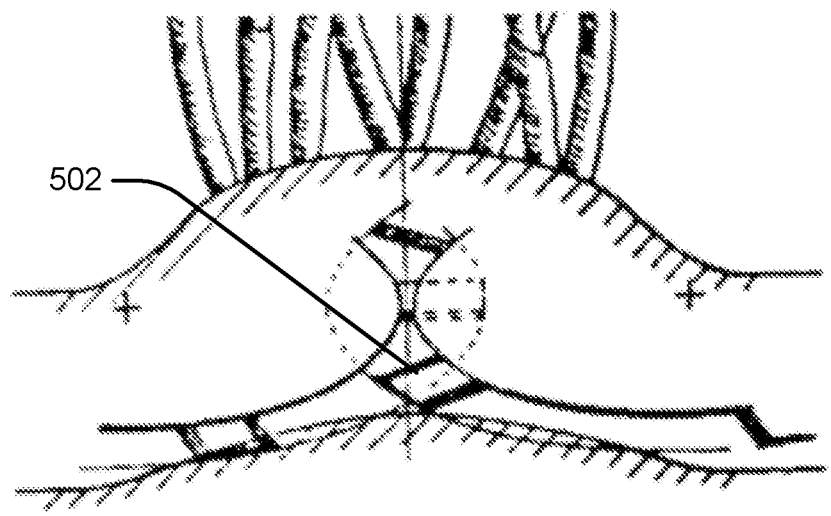

FIGS. 5a and 5b illustrate a front view of inclined base cutter discs and the cusp-shaped area consequential on their inclined plane. The cutters cannot cut the stalks in the center of the row close to the ground unless the crop is growing on a ridge. This inclination leaves a cusp-shaped area 500 in the center of the row where stalks are cut appreciably higher than desired. Traditionally the crop is grown on a low ridge 502 (FIG. 5b) to fit the cusp-shaped area as well as possible. In many circumstances there are other advantages to growing the crop in this manner, but sometimes it is neither desirable, or possible, to do so and the crop may be growing from level soil. The modifications disclosed herein address this problem by inclining the shafts of the spinning discs in the plane viewed from the front of the machine, to reduce the missed area by the cusp when the whole mechanism is also inclined forward. Cane cutters may address the problem using pivoted, ground-following blades. This embodiment addresses the problem using rigidly mounted spinning disc cutters.

Evidence indicates that the best way of handling the stalks is with a continuous notched disc, similar to a circular saw. The re-growth of the stubble, wherever that is appropriate, is superior after the saw-type action. Unfortunately stones can readily damage the notched discs and a large circular saw blade is very expensive. A simple notched disc may not be sufficiently aggressive. This matter is addressed with a blade shape and mounting which secures a saw-like action that uses replaceable sections. To further protect the blades an apparatus is proposed of reducing stone damage, as explained below.

The counter-rotating disks of the traditional base cutter form a nip into which stones and other uncuttable objects can be taken and exert great forces on the structure and drives for the discs, as well as damage to the sharp blades. If the drive shafts to the discs are pivoted in such a way that they can easily move apart in response to excessive forces in the nip, the blades and mechanism generally will be protected from damage. This allows a lighter construction and a great increase in the longevity of the sharp blades.

The horizontally-rotating rollers that help feed the crop across the blades into the conveying mechanism of conventional cane harvesters are fairly complicated to install and may damage the crop. Equipping the twin discs with resilient pads to provide additional rearward moving force to the crop, the rollers would not be necessary. This would save costs, simplify the machine, and possibly reduce damage to the crop. For hydraulic drive the two driving sprockets are mounted directly to the motor output shaft (i.e. a lay shaft is not necessary).

It is desirable to design a base cutter and appropriate drives which will allow the shafts to run at an angle to the vertical. This angle should be adjustable over a range of several degrees and able to spring apart if an uncuttable obstruction enters between two rotating discs. In a preferred embodiment, the shape of the base cutter tips is adjusted to minimize the splitting of cane butts and resulting field losses. In addition, the blade should be detachable, with a shape that combines a sawing action with high resistance to stone damage. Vehicle tires, or a similar resilient structure, may be mounted onto the cutting discs in order to force the stalks out rearward.

Figure 6A:
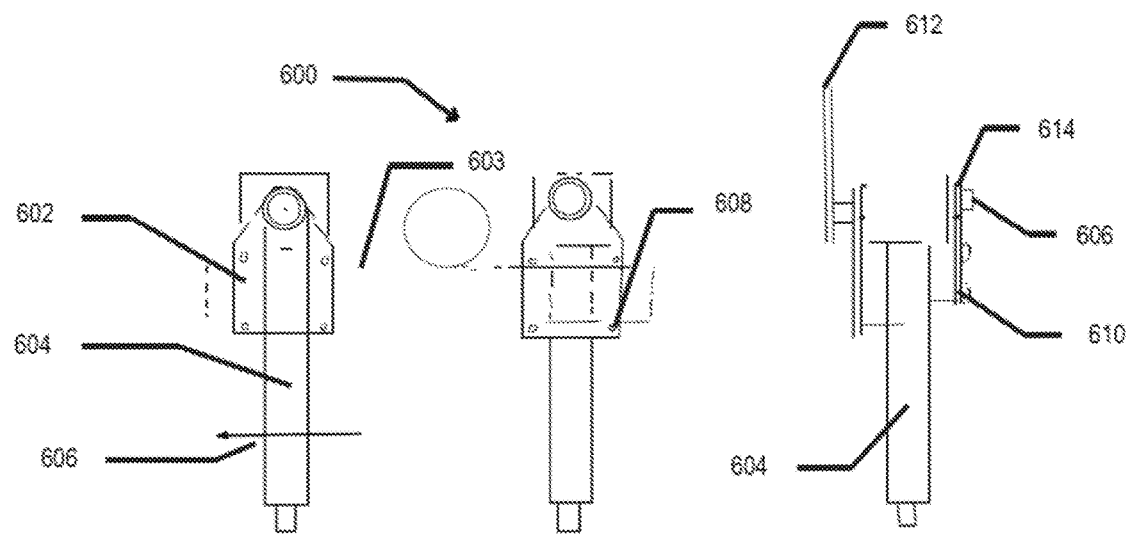
FIGS. 6a and 6b illustrate a general arrangement of pivots for base cutter gearboxes.
Figure 6B:
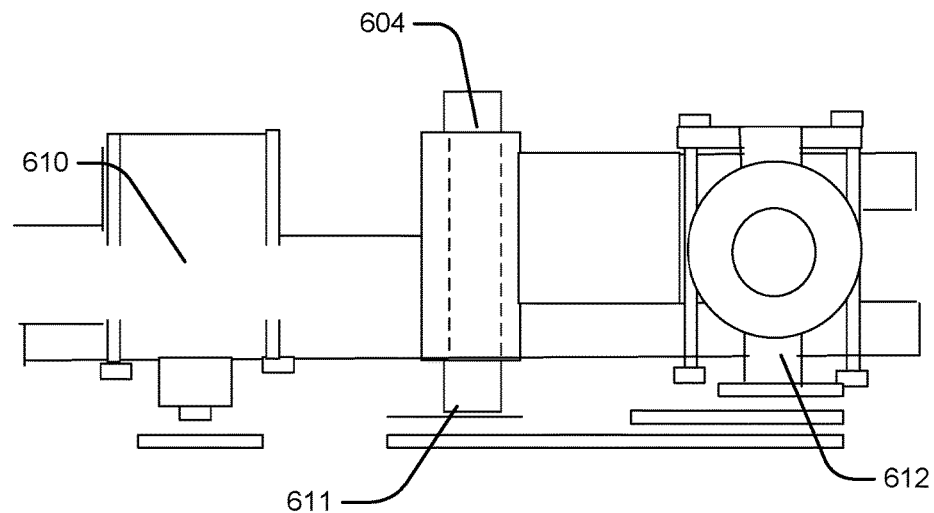

FIGS. 6a and 6b illustrate a general arrangement of pivots for two right-angle gearboxes, allowing the vertical shaft to be set at a predetermined angle to the direction of travel of the base cutter and/or allow the cutting discs to move apart. The drive arrangement 600 is a horizontal lay shaft 602 which drives two sprockets 611 (driving sprocket), 612 (driven sprocket), which in turn drive the horizontal shafts of each of two (handed) right-angle gear boxes 610. Reference 606 indicates the sense in which the vertical shaft 604 pivots. Each gearbox 610 is suspended in a frame constructed of approximately 5" channel members 603 so that it can pivot around the axis of its horizontal shaft. The bearing housing of the gearbox horizontal shaft 616 pivots in a ring 614. Movable plates 602 which hold the gear pivots 616 are secured by four bolts 608. The pivoting structures can be moveable in the frame to allow different distances between the gearboxes and also for chain-tensioning purposes.

Figure 7:
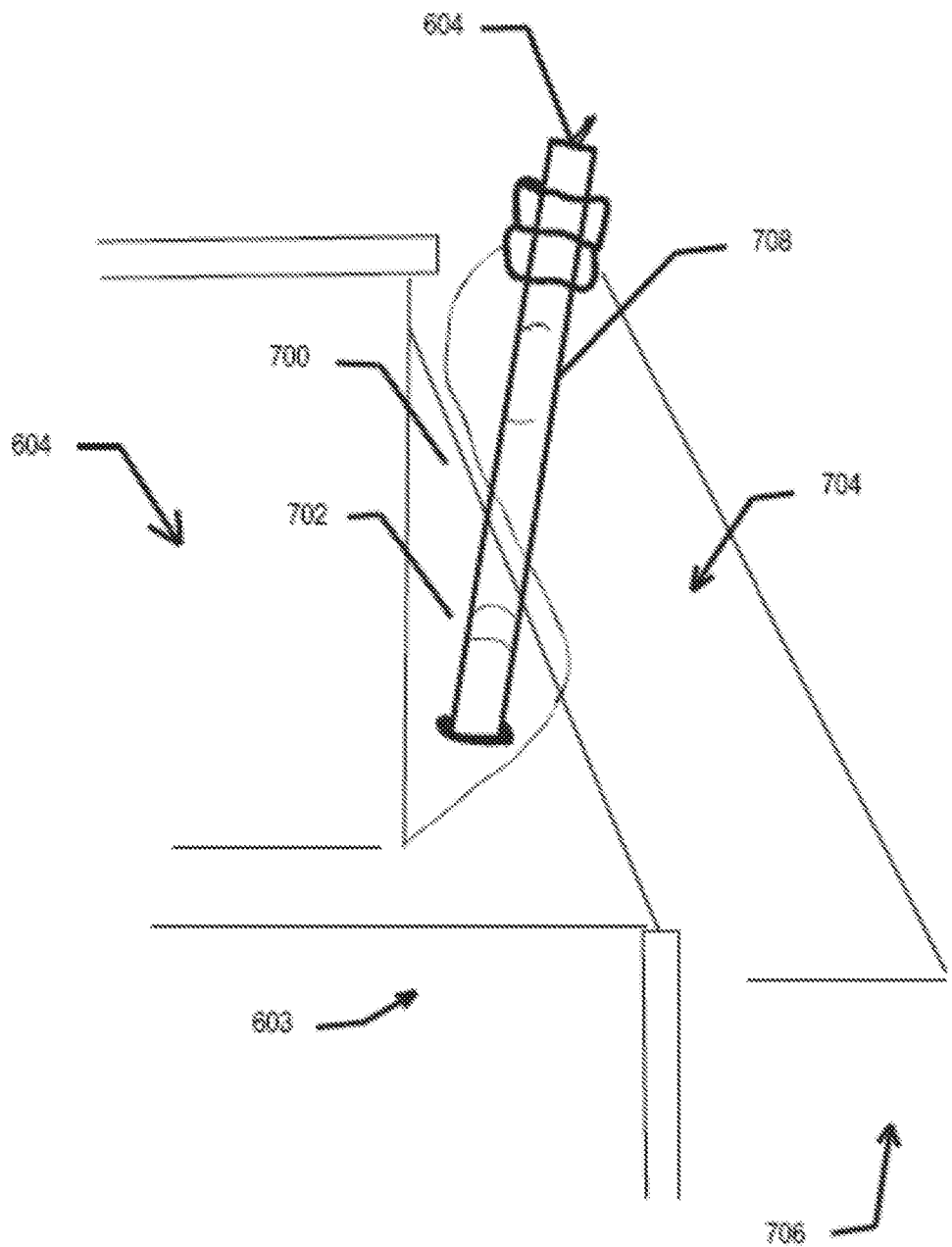
FIG. 7 illustrates a restraining arrangement to set the angle of the pivot vertical shaft.

FIG. 7 illustrates a restraining arrangement to set the angle of the vertical shaft. One pivoted member 702 may be attached to a bracket 700 welded to the gearbox 610, and another may be welded to a bracket 704 attached to the side frame 706. A threaded rod may be welded to the first pivoted member 702 and pass through a hole in the pivoted member in the side frame bracket 704. Suitable adjustable restraining devices, such as these brackets 700, 706, prevent the vertical shaft of each gearbox 610 from pivoting too close to the opposite unit, thus setting the distance apart of the two discs which carry the blades.

Figure 8:
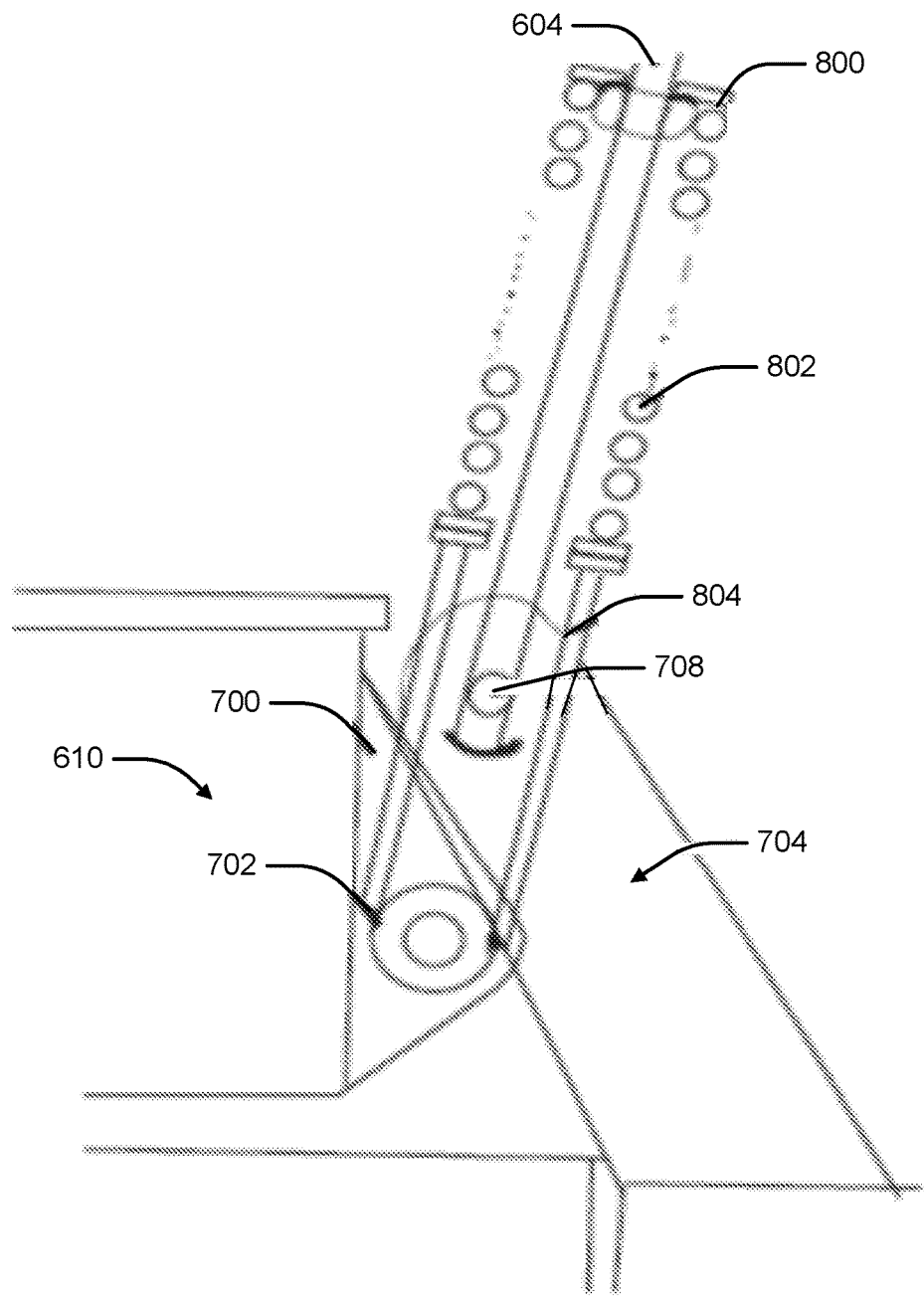
FIG. 8 illustrates another view of vertical shaft with spring loading device.

Referring to FIG. 8, a spring loading device may force the vertical shafts together to resist normal opening forces in cutting the crop, but allows the cutting discs to move apart from uncuttable obstacles. Mounted with, or separate from, the restraining device is a device that may spring-load the two gearboxes, so that the vertical shafts are forced together. The strength of the spring-loading is chosen to prevent the cutting discs moving apart, due to the forces normally encountered in cutting the crop. But the setting is adjusted to allow the discs to move apart when a non-cuttable object is encountered. The spring-loading can be substituted by suitable hydraulic ram or rams, accumulator, and pump. In FIG. 8, a bridge structure 804 is welded on the pivoted member 702 and moves freely around pivoted member 708.

The threaded rod 604 may be welded into the pivoted member 708. A pressure plate 800 tightens pivoted member 702 on the rod 604 to compress the spring 802.

The relative degree of inclination of the two vertical shafts, the consequent spacing of the discs holding the cutting blades, and the force required to move the discs apart for an uncuttable object to pass through, may all be adjustable. Therefore the unit can be set to deal with a wide range of row shapes, crop conditions and field conditions.

Figure 9:
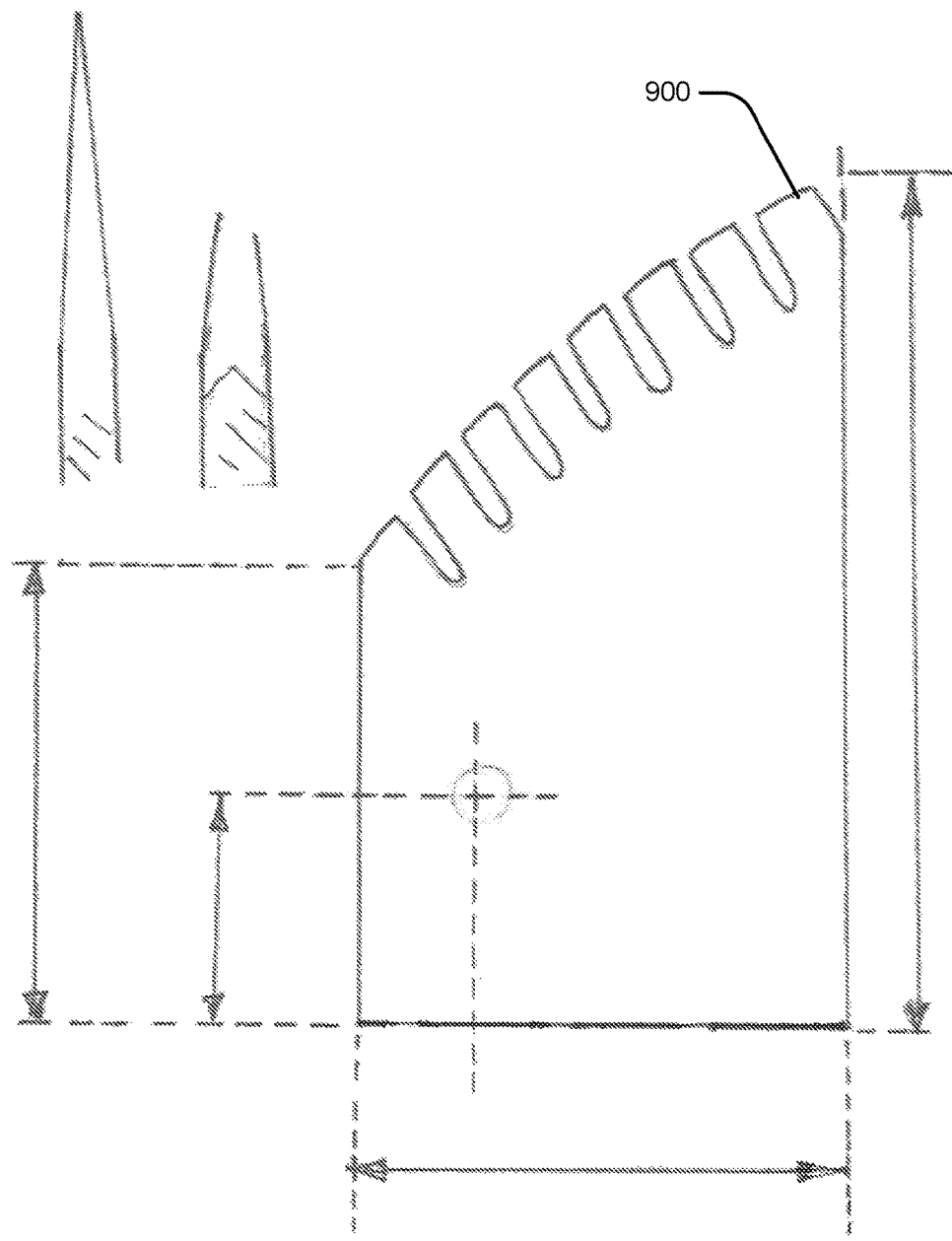
FIG. 9 illustrates notched cutter blades with exemplary dimensions.

FIG. 9 shows a blade designed to combine the best features of replaceability with saw-type action. Mounted on the blade-supporting discs are a number of specially-designed, scimitar-shaped, notched blades 900 fabricated from high tensile steel. These blades are retained in sockets made from high tensile steel to resist wear if the blade chafes in the socket. A single retaining bolt prevents the blade from moving out of the socket by centrifugal force. A preferred embodiment may have 7 slots or notches equally spaced along the blade.

Figure 10:
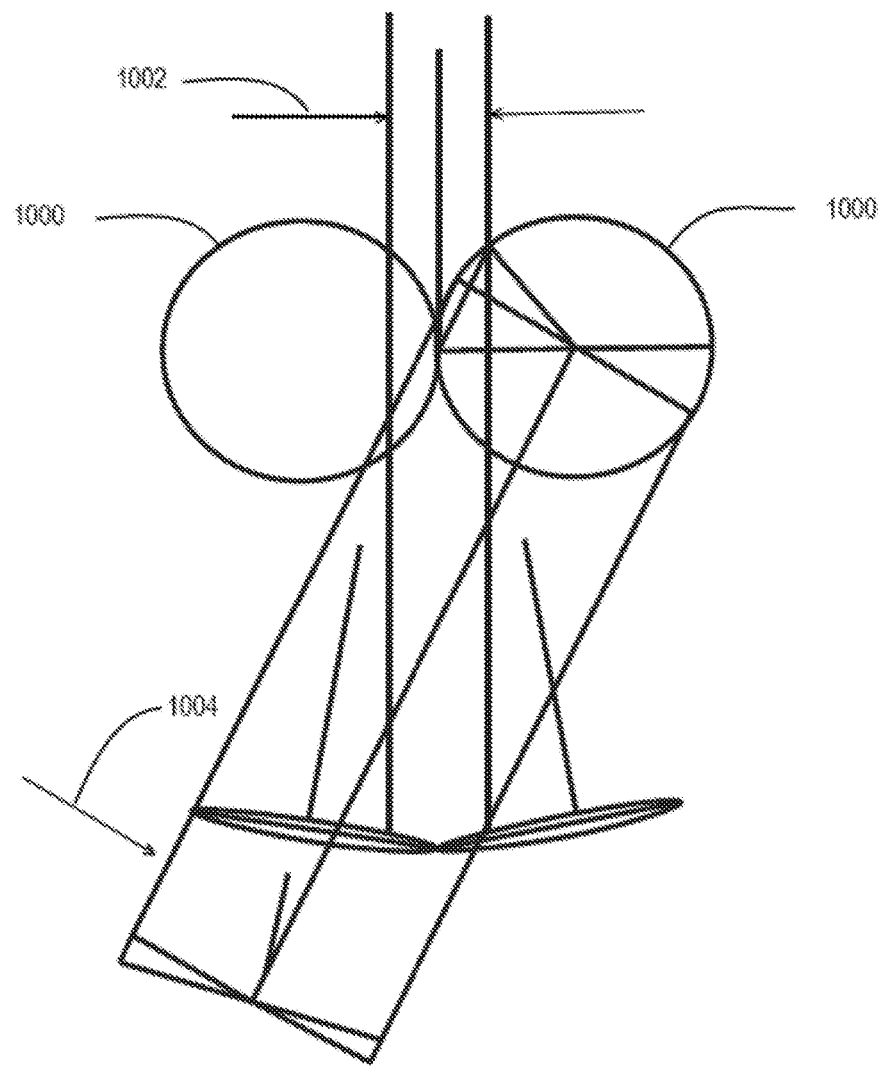
FIG. 10 is a diagram of tire-like structures which grip the cut stalk and push it to the rear.

Attached to the same blade-supporting discs may be one or more vehicle tires 1000 or tire-like structures (FIG. 10) which touch, or nearly touch, in the center. These structures, meeting approximately in the center of the zone of horizontal cut, or cutting zone 1002, grip the cut stalks and push them rearwards. The tire structures may have a tilt of approximately 10 degrees 1004, consisting of inward and (a much smaller) forward tilt. The degree of resilience in the tire is controlled by either the choice of tire or by drilling holes of around 5-7 cm. diameter at intervals around the side walls of the tire.

Figure 11:
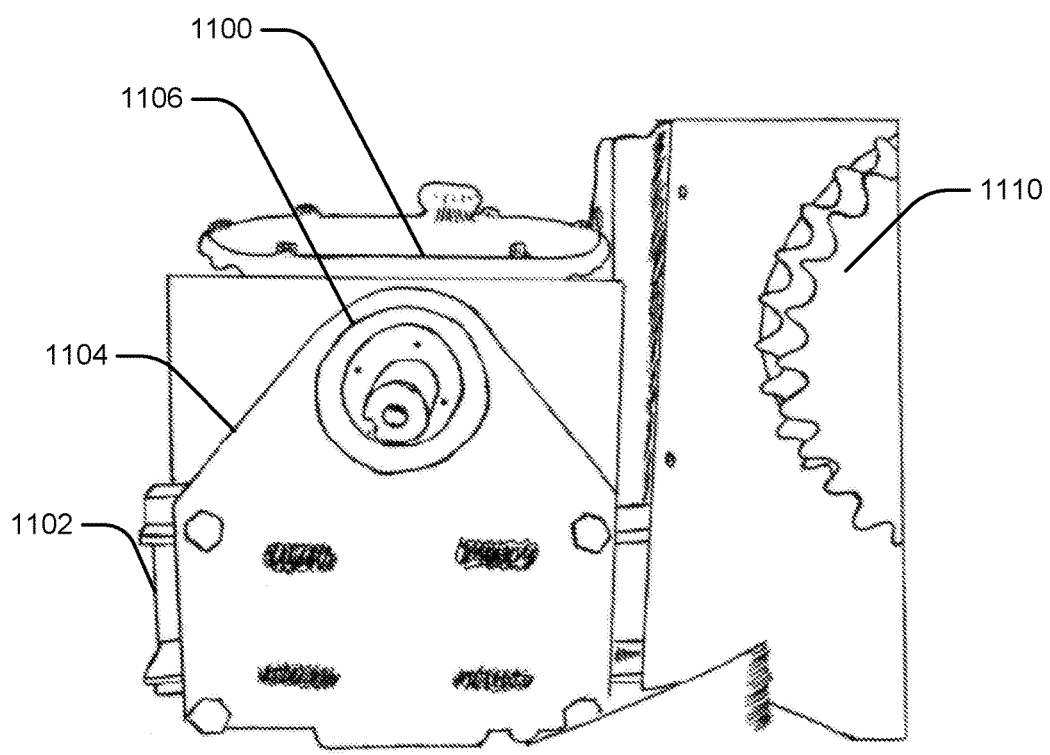
FIG. 11 shows the pivoted mounting of a blade cutter gearbox.

FIG. 11 shows the pivoted mounting of a gearbox 1100 onto a frame formed of two 5" channel pieces 1102. The plates 1104 onto which the pivots 1106 are mounted, are held to the frame by four bolts 1108, allowing the distance between the driving sprocket and the driven sprocket 1110 to be adjusted.

Figure 12:
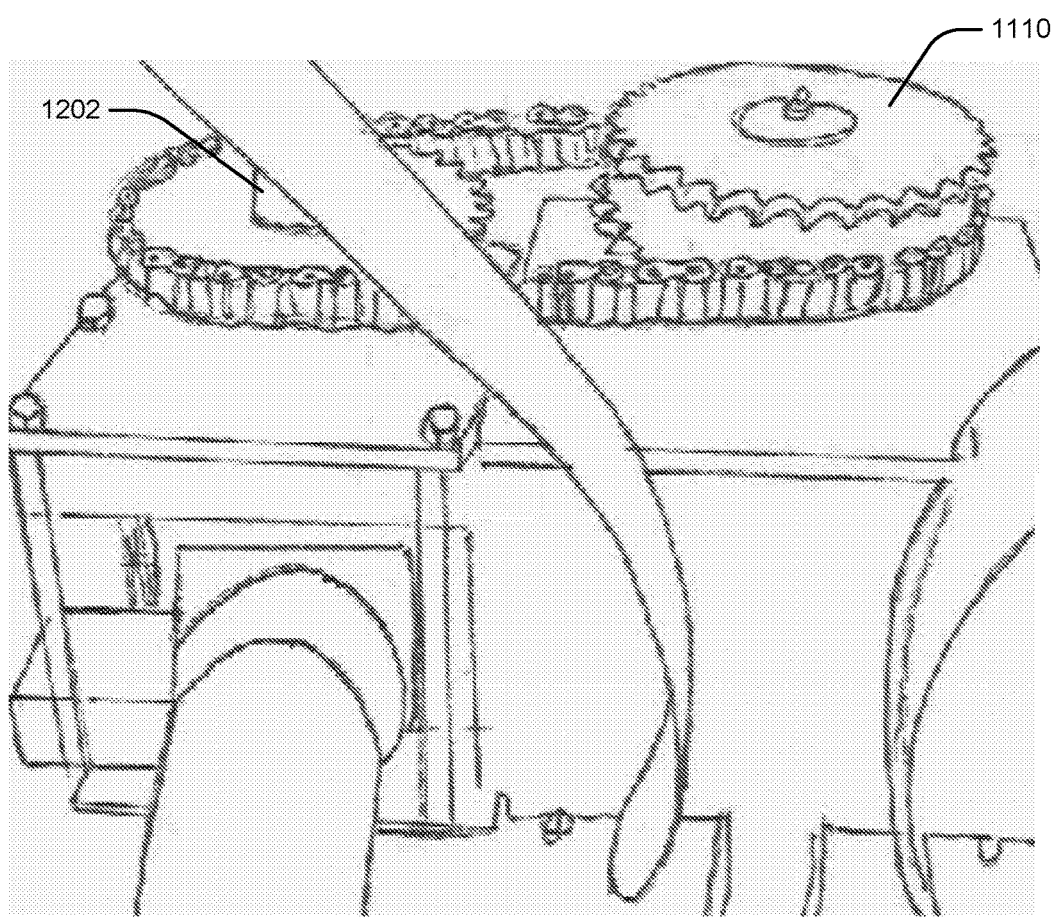
FIG. 12 shows the vertical axis of the gearbox.
Figure 13:
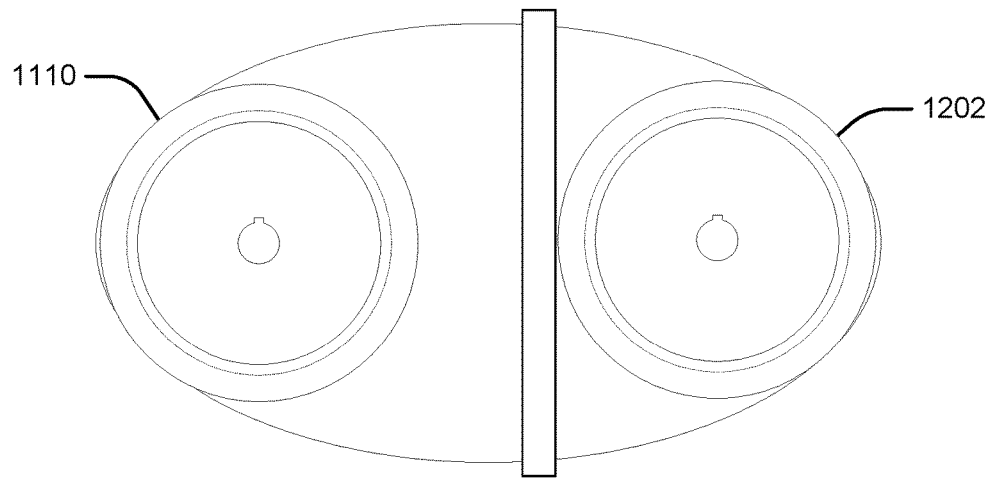
FIG. 13 shows another view of the gearbox.

FIG. 12 shows the vertical axis of the gearbox inclined towards the centre of the machine and FIG. 13 shows it inclined outwards. Because the pivots 1106 are concentric to the bearing housings 1112 of the horizontal shafts of the gearboxes, the chain length remains constant throughout the angular movement of the vertical shaft. The driving 1200 and driven sprockets 1110 are shown.

Figure 14:
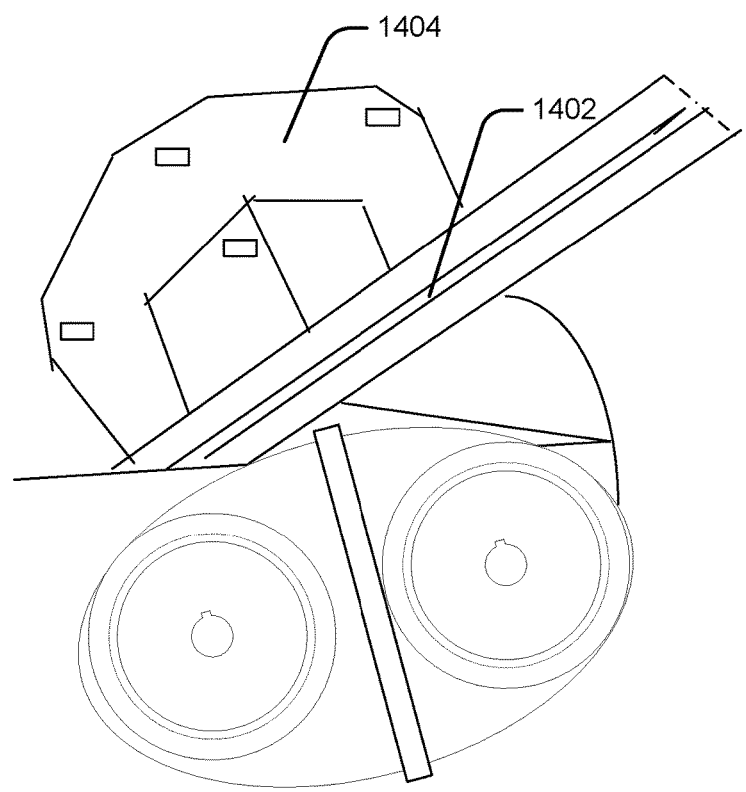
FIG. 14 illustrates the blade discs mounted to a vertical shaft.
Figure 15:
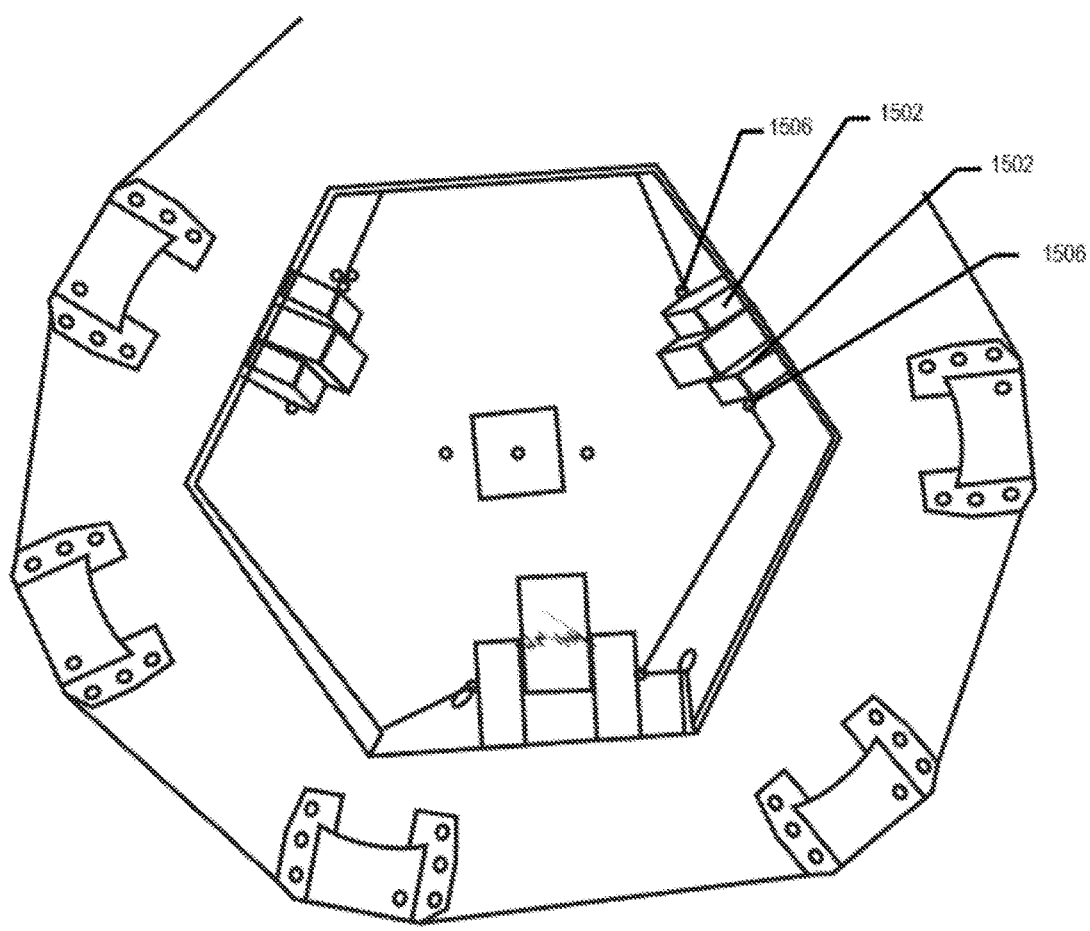
FIG. 15 diagrams the base cutter discs.
Figure 16:
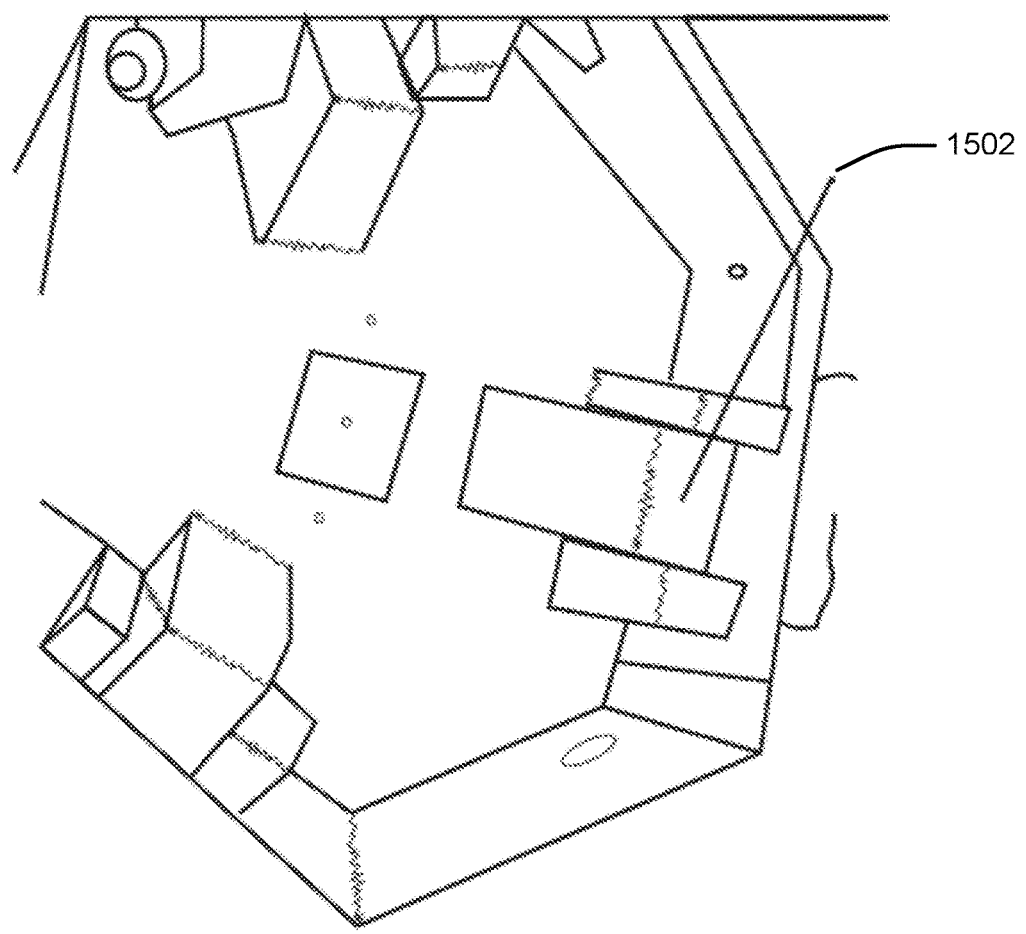
FIG. 16 illustrates the rubber cylinder used to secure the blades on the base cutter disc.

FIG. 14 shows the blade-holding discs 1402 mounted to the vertical shaft. A hexagonal structure 1404 surrounds the vertical shaft housing and rotates with it. This structure is referred to as the "drum". At the upper end of the drum are three bearings positioned with their race casings touching a ring which forms part of the vertical shaft housing. In the embodiment shown in FIG. 15, the base cutter disc is connected to the drum by three resilient structures. These resilient structures are formed from steel plates 1502 with holes linked by rubber cylinder 1504 which is compressed by tightening a bolt 1506. Small ridges in the holes in the steel plates and matching grooves on the rubber cylinder 1504 (see also FIG. 16) ensure that the rubber 1504 does not rotate in the steel holes.

Figure 17:
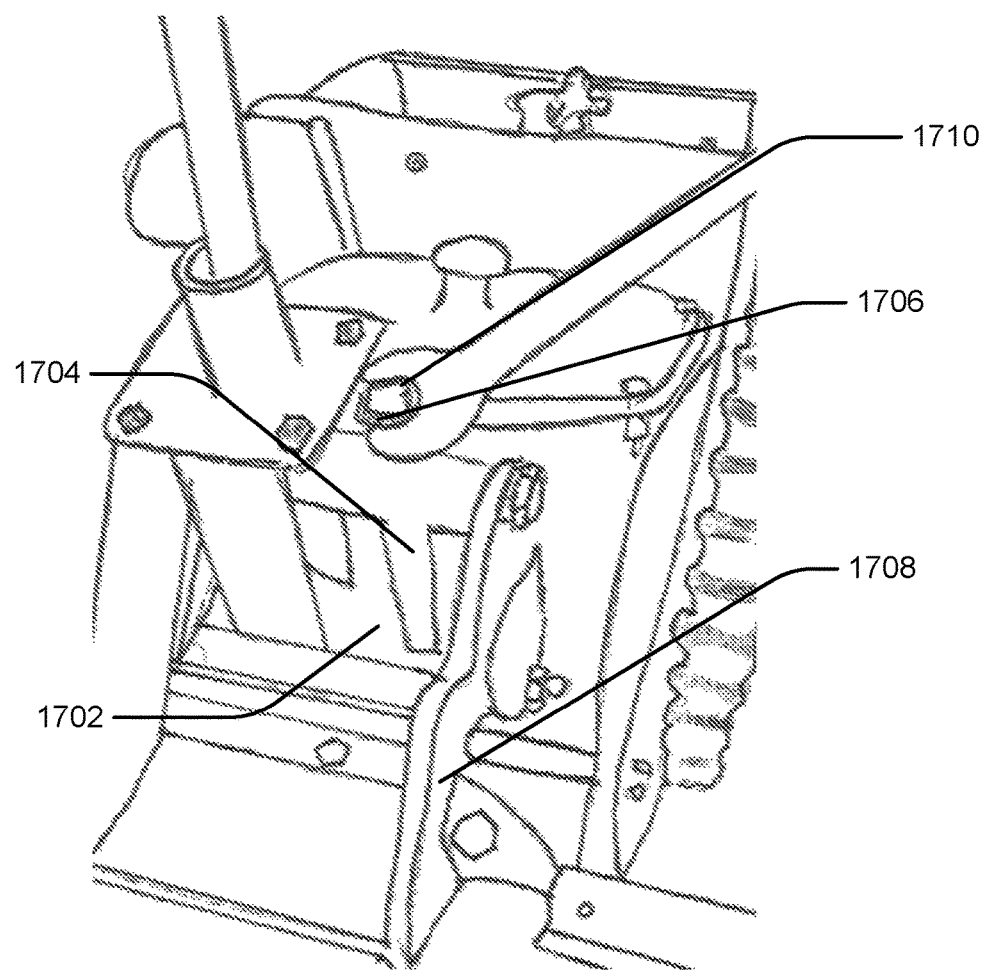
FIG. 17 illustrates a possible restraining arrangement for the base cutter vertical shaft.
Figure 18:
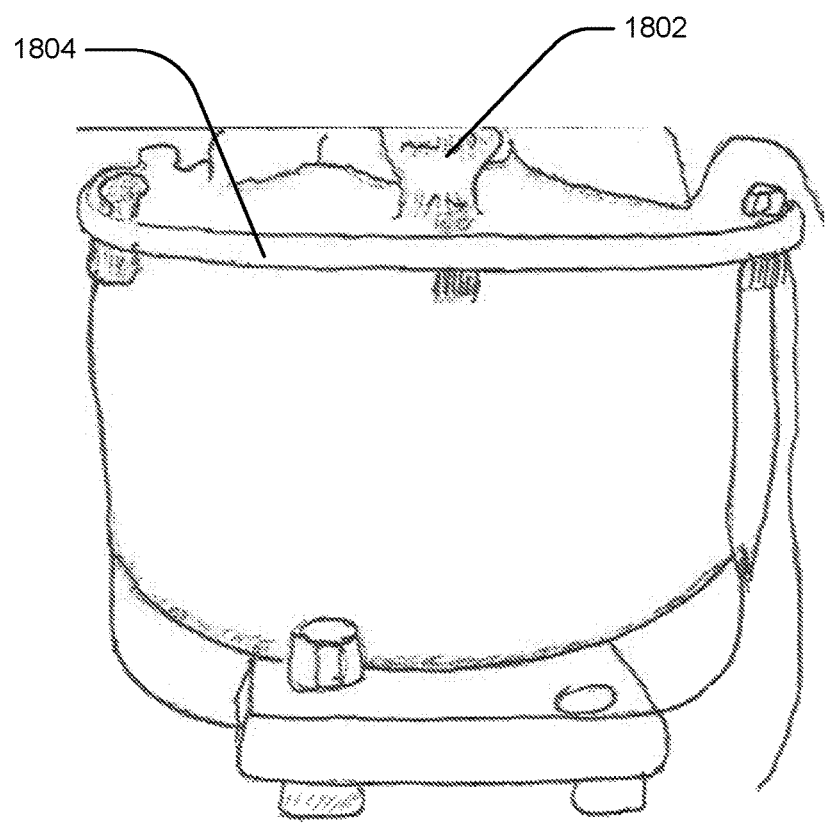
FIG. 18 illustrates an alternative restraining arrangement.

FIG. 17 shows one possible restraining arrangement to set the maximum inward inclination of the vertical shaft. A pivoted member 1702 is attached to the gearbox. This pivoted member bears a threaded rod 1704 which passes through a hole in pivoted member 1706 on the side frame of the base cutter 1708. This side frame may itself be rigidly attached to the frame members holding the gearbox pivots 1702. By adjusting the position of nuts 1710, maximum inward inclination of the gearbox and its vertical shaft can be set. FIG. 18 shows an alternative restricting method with an adjustable bolt 1802, threaded into a plate 1804 which is welded to the gearbox and engages on the side frame.

Figure 19:
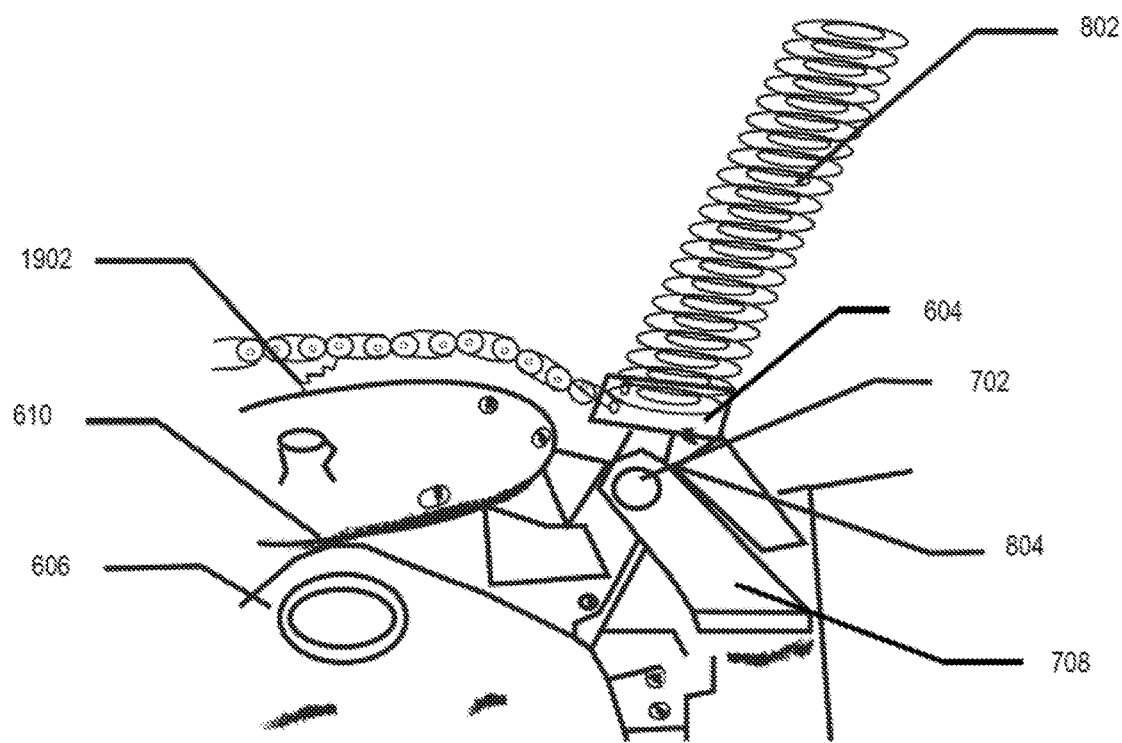
FIG. 19 shows one method of spring loading the base cutter vertical shafts.

FIG. 19 shows one method of spring loading the two vertical shafts together 1902 in an inward sense. In this case it is integral with the restraining mechanism in FIG. 17. The pivoted member 702 mounted to the gearbox 610 bears a bridge structure 804 which holds a plate 1902 above the pivoted member 708 mounted on the side frame 706. A rod 604 attached to member 708 passes through the plate 1902 and one or more compression springs 802 are slipped over the rod 604 and tensioned downwards by a washer and nut turning on the threaded part at the top of the rod 604.

Figure 20:
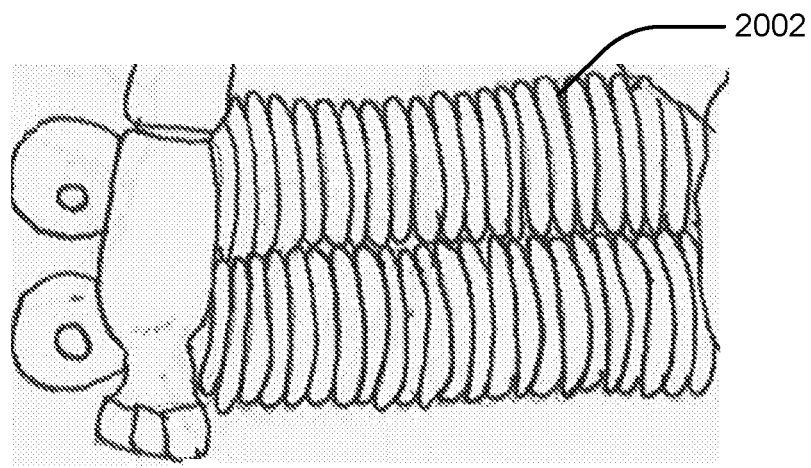
FIG. 20 shows an alternative mechanism for spring loading the base cutter using adjustable springs.
Figure 21:
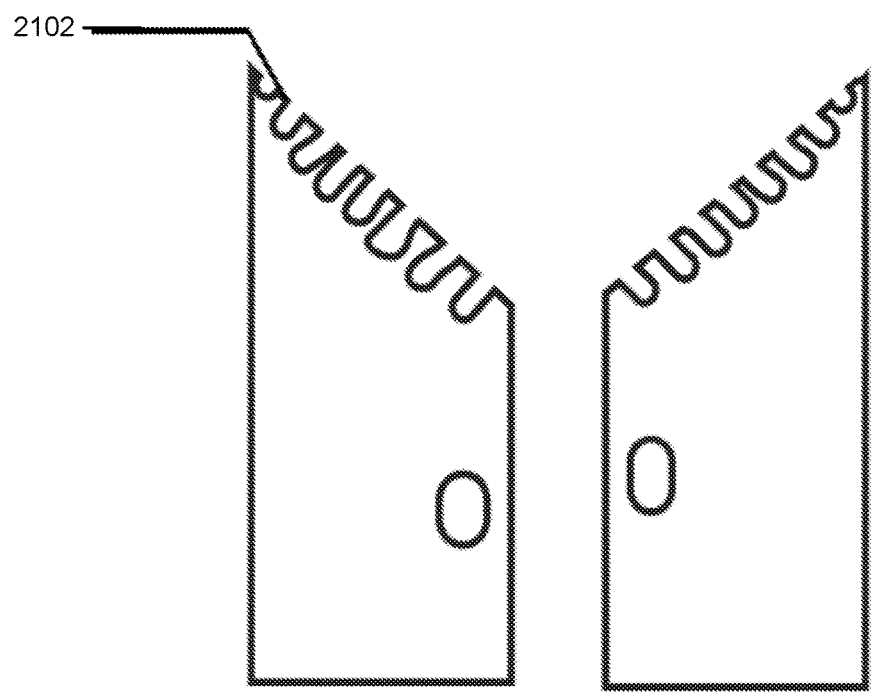
FIG. 21 has been cancelled.

FIG. 20 shows an alternative mechanism where adjustable springs 2002 act mutually on the two opposing gearboxes. Tension is increased by tightening nuts. A hydraulic mechanism may be used to achieve the same result. In such a mechanism, a ram pushes the top of the two gearboxes apart; an accumulator and hydraulic pump adjust the pressure exerted by the ram, which is forcing the tops of the gearboxes apart, and hence thrusting the vertical shafts together.

Figure 22:
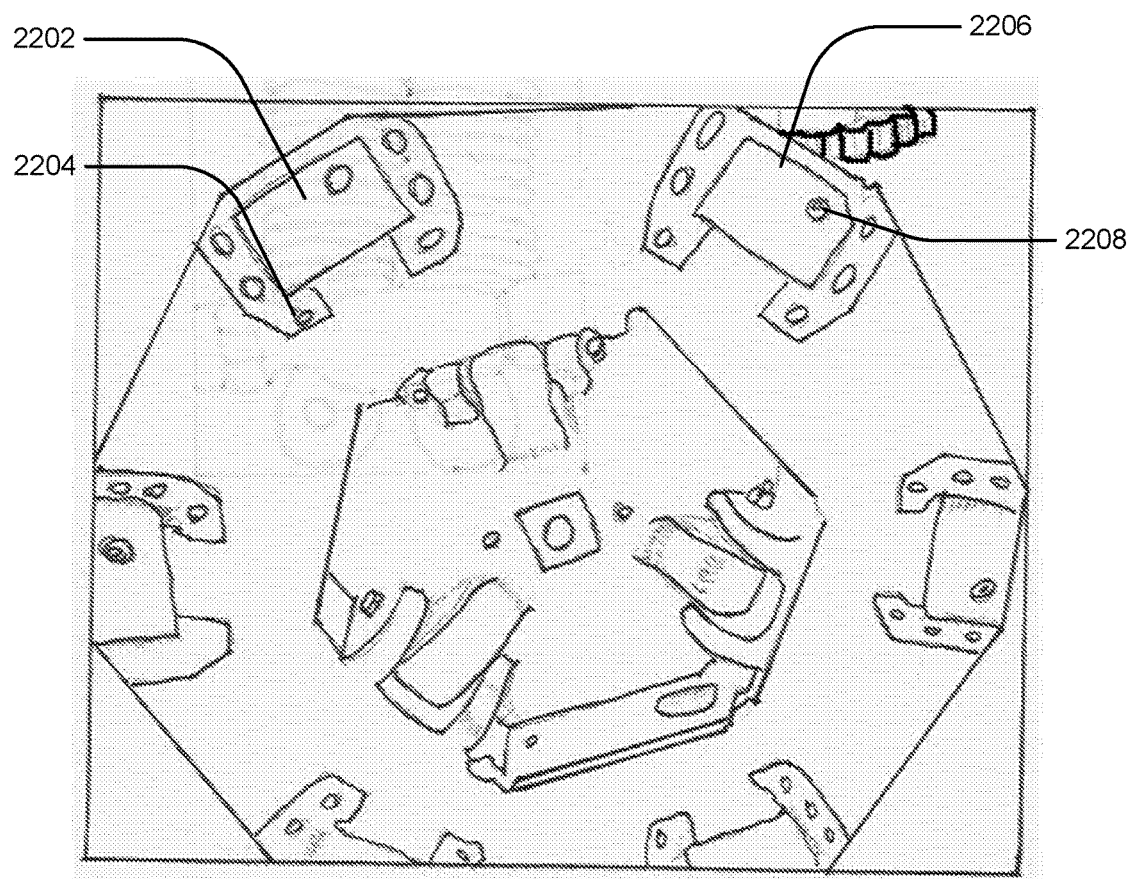
FIG. 22 depicts a set of notched cutter blades.

The shape of the blades 2202 which attempt to combine the best of a sawing action and easy detachability, are best seen in FIG. 22 and in dimensioned drawings as shown in FIG. 9. These dimensions can be varied to suit available materials and details of the base cutter design.

Figure 23:
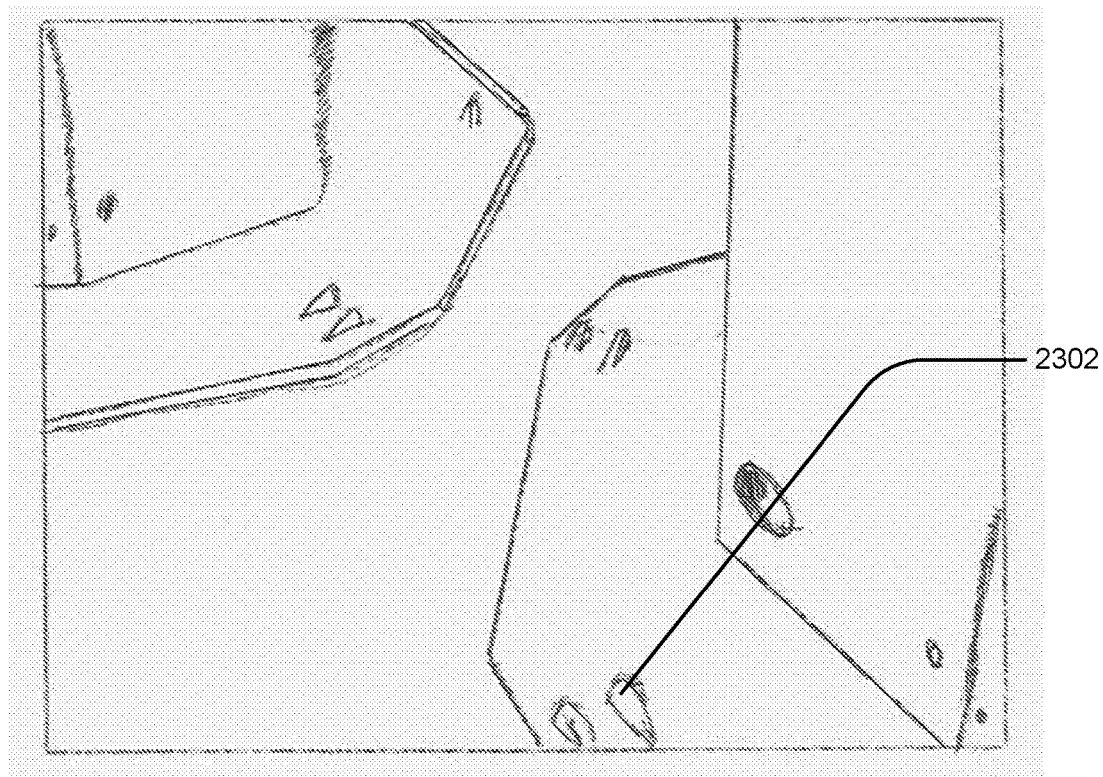
FIG. 23 illustrates the blade mounting sockets on disc cutter plates.
Figure 24:
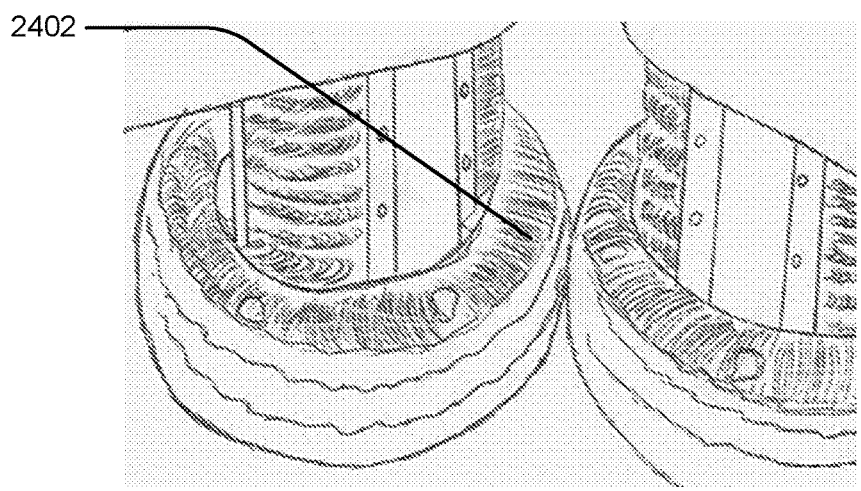
FIG. 24 shows shaft drums with guard plates.

Mounting sockets for the blades are shown in FIG. 23. The socket is composed of high-tensile steel flats 2302 welded through holes 2304 onto the underside of the base cutter disc plates. A plate 2306 is welded across the flats and carries a hole for a retaining bolt 2308. The nut side of the bolt 2402, shown in FIG. 24, is guarded by sloping plates from being struck by crop stalks or stones, etc.

Figure 25:
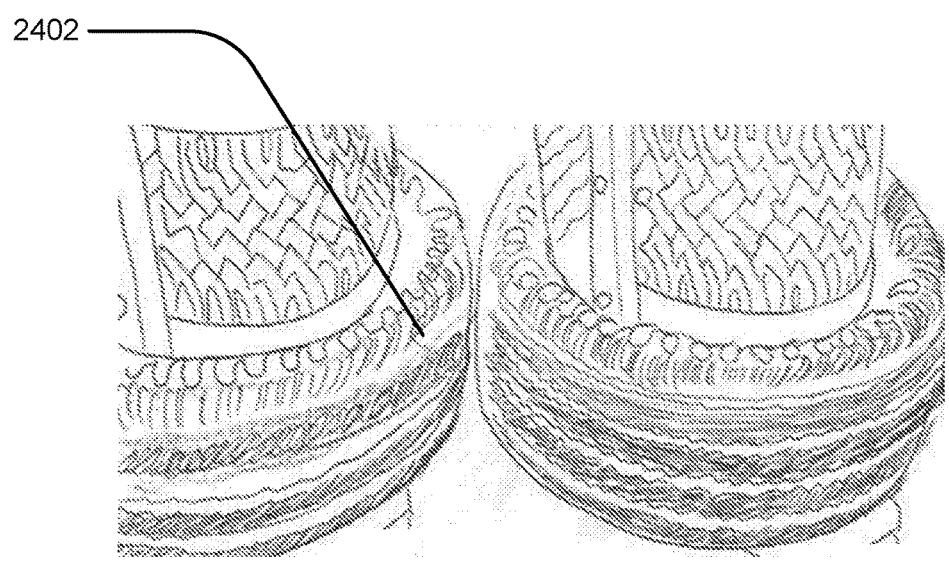
FIG. 25 depicts the tire structures mounted to the base cutter discs and used to pull the stalk rearward.
Figure 26:
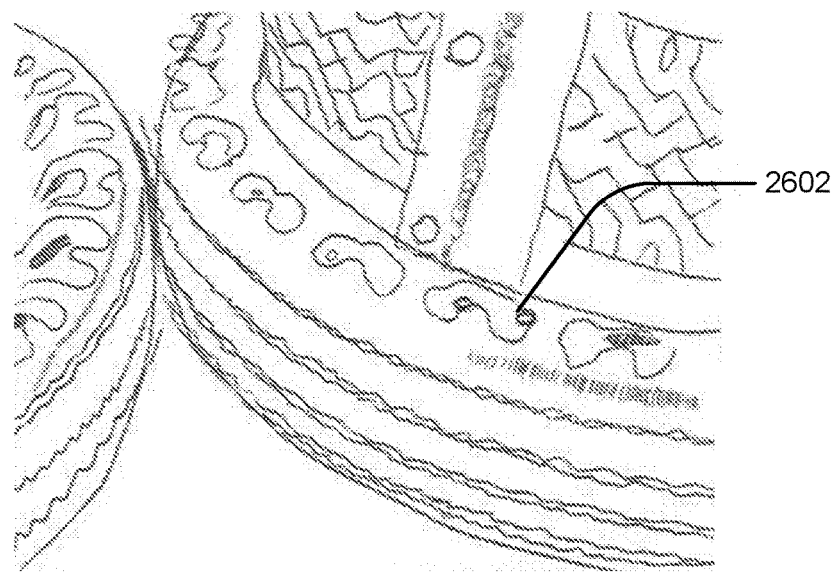
FIG. 26 is a closer view of the tire structures.
Figure 27:
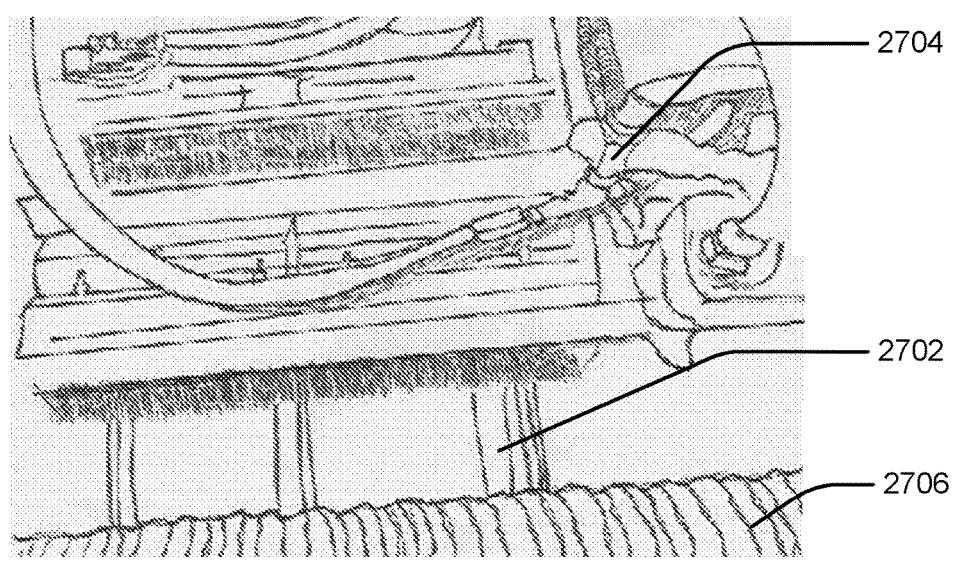
FIG. 27 shows the holes drilled into the tire to make it more resilient.

FIGS. 25 and 26 show two views of the tires 2502 mounted to the base cutter discs; these tires increase the rearward movement of the cut stalks. FIG. 27 shows the walls of the tire drilled with holes 2702 to change its resilience.

Feed Conveyor

Figure 28:
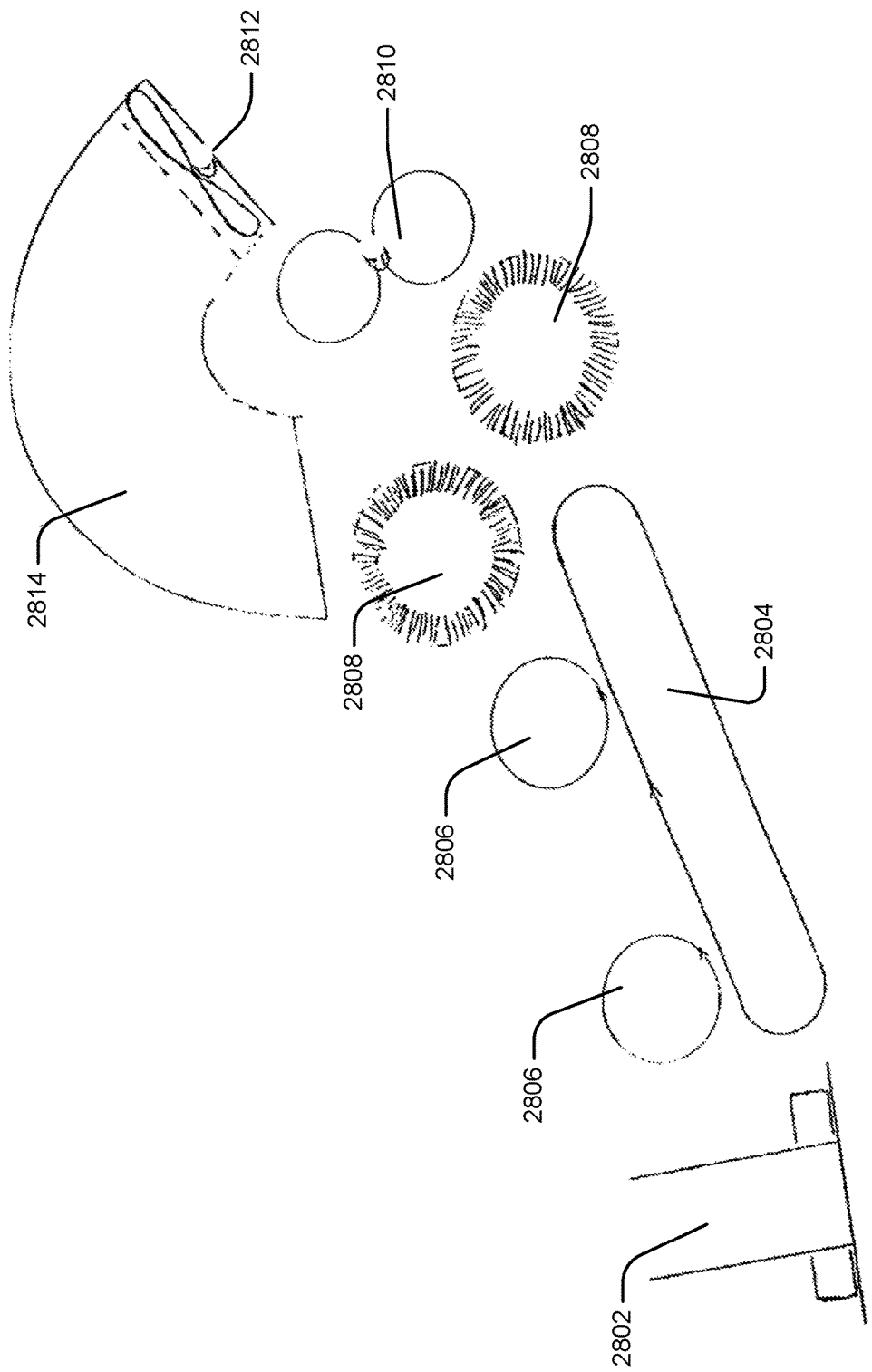
FIG. 28 illustrates the feed conveyor, brushes and feed roll.

A feed conveyor with a pressure roll in the front on the top, may be used to convey stalks through the machine. FIG. 28 illustrates a conveyor 2802, brushes 2804 and feed roll 2806. The de-leafing of sweet sorghum stalks by brushing requires more exposure of the surface area than the de-leafing of sugar cane stalks by grabbing. In addition, sweet sorghum stalks require kinder treatment because they are less durable than sugar cane stalks. An additional feed roll may be added in the center of the conveyor 2802 to spread the stalks to give more area for the brushes to work and also reduces accumulated debris in the conveyor 2802 area. The conveyor 2802 may be resurfaced for better gripping the stalks. The conveyor can be extended to meet the lower brush to eliminate leaf loss, which also allows the extractor fan to be replaced with a simple blower.

De-Trashing Roll

A de-trashing roll, which may be located in the middle of the conveyor, is used to remove free trash, such as leaves, that are carried along the conveyor with the sorghum stalk. A feed roll may be added to the center of the conveyor by wrapping the conveyor with softer rubber sheets to meet the need for kinder conveying.

Brush Rolls—Leaf Stripping Mechanism

This section describes improvements to the harvesting of unburnt stalks of large grass crops like sugarcane and sweet sorghum. Means are described for removal of leaf material and its disposal, using brushes whose peripheral speeds considerably exceed the speed of the stalks which are moved through the machine by one or more restraining nips. Two brush rolls, one on top and another below, both at the end of the conveyor, sweep leaves from the stalks. The top roller center is forward and the rolls travel in the same direction as the conveyor but at a higher speed. Using this technique it is possible also (a) to use an extractor fan which projects the freed leaves forcibly onto the uncleaned stalks to increase the proportion of freed leaf material, and (b) that the conveying and cleaning of the crop can be effected with elements having their axes substantially vertical.

There is interest in harvesting equipment which can cut and clean unburned sugarcane and crops like sweet sorghum without chopping the stalks into short pieces in order to remove the leaf material with extractor fans.

The stripping of leaves in this machine is based on the acceleration of the stalk from a conveyor by a nip and the projection of that stalk between rubber fingers, over which a stream of air is directed. The air stream helps the ends of leaves to be engaged by a flail, which then forcibly pulls the leaves away from the stalk.

An alternative method of cleaning stalks in a typical harvester, such as the well-known Centurion, is the subject of this application; the method could also be applied in an alternative machine also described herein. In particular, the disclosed invention restrains the movement of the stalks while they are being acted upon by brush elements moving appreciably faster than the stalk but in the same direction as its travel. The loosened material may simply fall away from the cleaned stalks but may also be removed by an extractor fan. Such fans are standard technology on "combine" cane harvesters, but in a preferred embodiment of the disclosed invention, the fan directs the removed material onto the stalks which have not yet passed through the final nip. With this mechanism the broken pieces of leaf become additional means of stripping material and cleaning the stalks, as well as depositing the material under the machine.

The objectives of the leaf stripper are to use brush elements which are rotating to one or both sides of stalk material of crops like sugarcane or sweet sorghum to remove the leaves. Such brushes to rotate appreciably faster than the rate at which the stalk is being restrained by one or more conveying elements; to remove the loosened leaf material with an extractor fan, which forces the material back over the stalks before they are engaged by the final nip, and to exploit concept I in a vertically-oriented mechanism instead of the conventional horizontal orientation.

Figure 29:
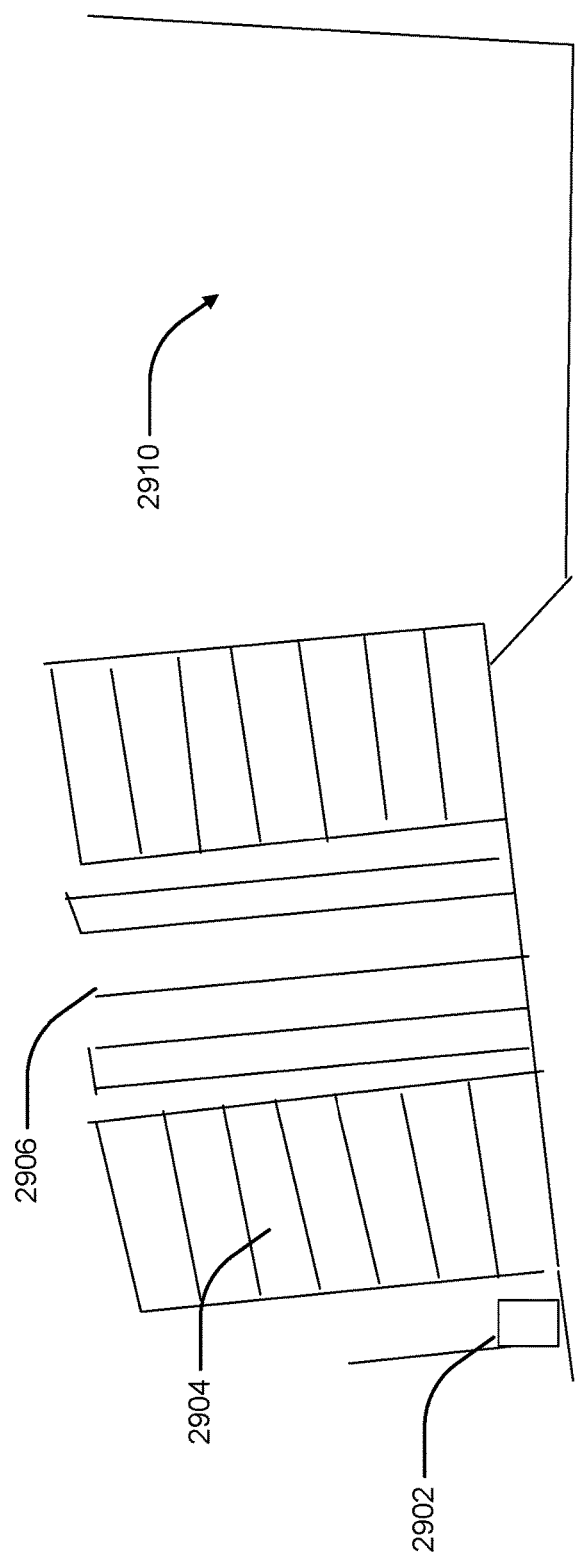
FIG. 29 is a drawing showing an arrangement of base cutter mechanism and the associated apparatus which move stalks through the system.

FIG. 29 illustrates the general arrangement of a conveyor accepting cut stalks from a base cutting mechanism 2902, such as that described above. The conveyor 2904 has one or more restraining rollers 2906 on top of it which ensure that the crop passes up the conveyor at the same speed at which the conveyor belt is moving. Brushes are mounted on rotating elements 2908. Following the brush elements there may be a further pair of rollers 2910 forming a nip which grip the stalks and move them at a speed similar, though not necessarily identical, to the conveyor speed. An extractor fan 2912 may be installed to draw freed leaf material from around the stalks as they pass rearwards into a bin. The extractor fan is housed in a cowling 2914 which forces the air and free leaf material down onto the stalks before they enter the final nip. The broken leaf material bombards the stalks, further freeing leaf material from them. This arrangement also ensures that the unwanted leaf material is disposed of downwards—i.e. avoiding the nuisance of airborne material around the machine.

Whole stalk cane harvesters, popularly called "soldier" or "Louisiana" carry the stalks through the machine in a more or less upright mode. On the other hand, cane harvesters popularly called "combine" harvesters, conventionally carry the stalks into the machine on a conveyor of which the driven shafts are parallel to the ground. Whole stalk machines for either cane or crops like sorghum, adopt the latter mode. However the leaf-removal mechanism described above can also be envisaged as being executed in a conveying system whose rotating axes are substantially vertical.

Figure 30:
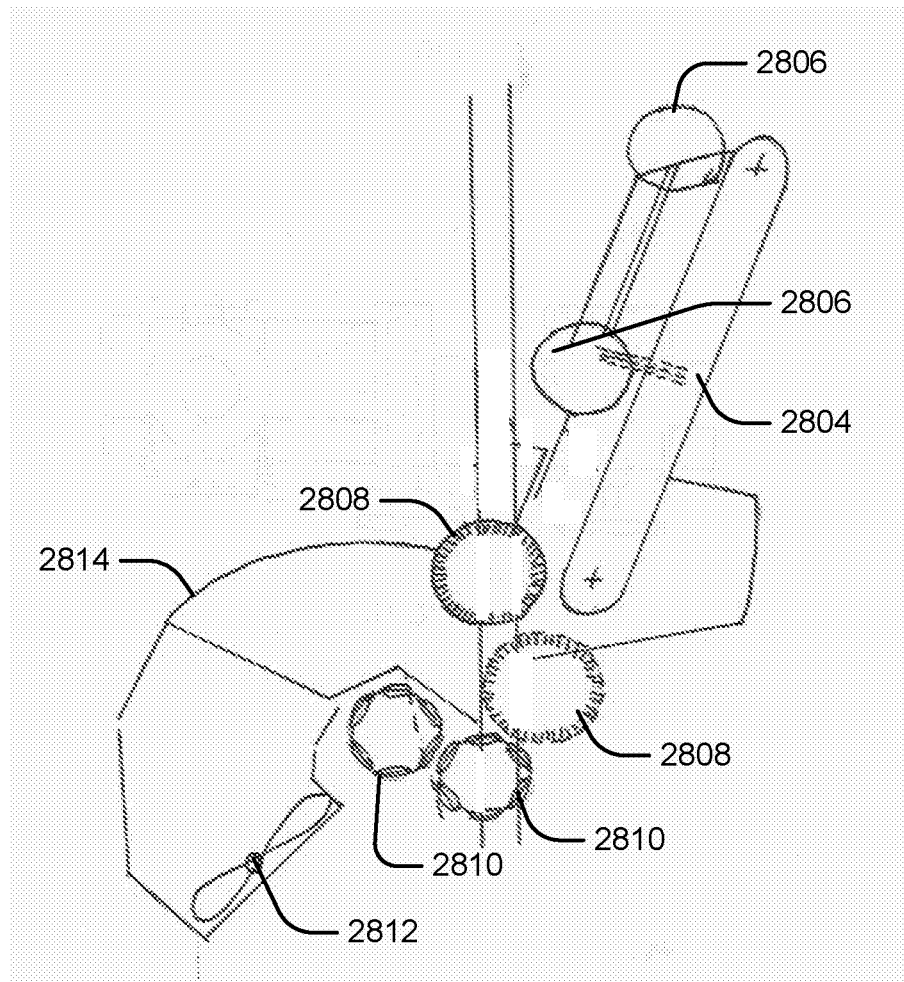
FIG. 30 depicts a side view of a base cutter and nip arrangement.

For example, in FIG. 30 an arrangement is shown in which a base cutter 3002 feeds a first nip 3004 formed of a number of vehicle tires on two vertically-rotating, opposed shafts. Brushes 3006 act on the stalks at a peripheral speed appreciably greater than the nip speed. A second nip 3008 rotates with a peripheral speed similar, though not necessarily identical, to the first nip 3004 and conveys the stalks to a receptacle 3010 for periodic discharge. Extractor fans may be suitably placed (e.g. to each side of, and slightly rearward of, nip 3008 if desired.

Figure 31:
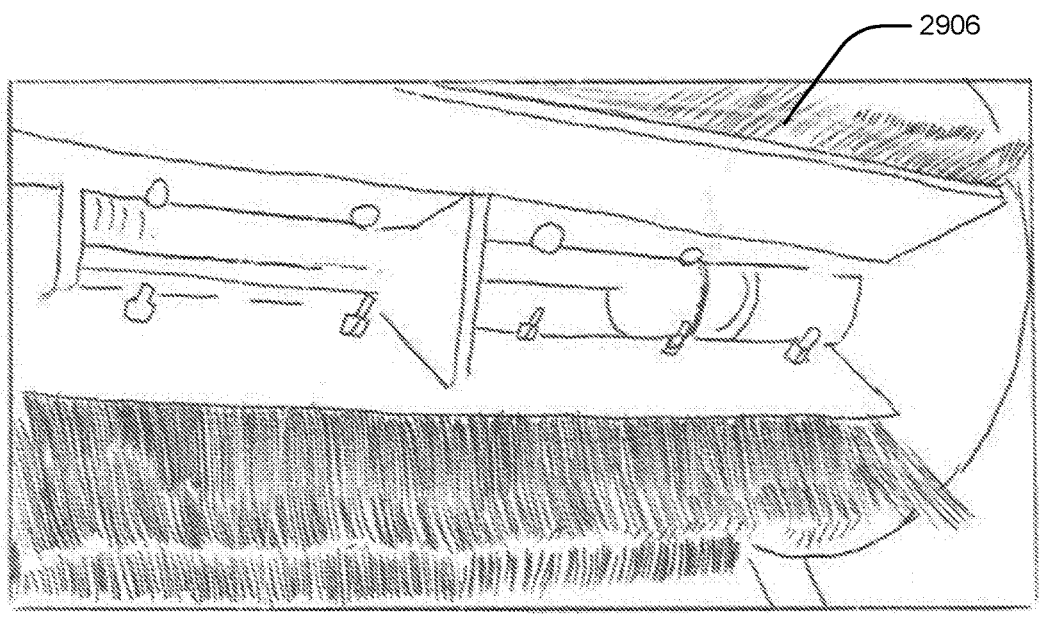
FIG. 31 illustrates another view of the conveyor and cutter systems with fan and cowling.

FIG. 31 shows an approximate scale drawing of a conveyor 2904 and two rollers 2906 which press the crop onto the conveyor, ensuring that it goes at the same speed as the conveyor belt is moving and cannot be easily accelerated whilst the brushes are acting upon it.

Figure 32:
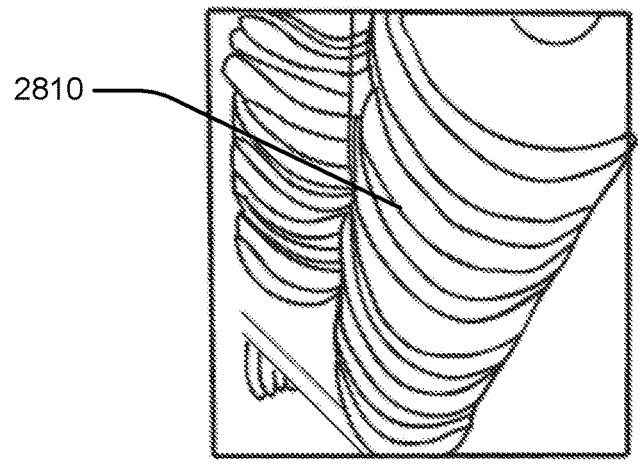
FIG. 32 is a photograph of the brush elements.
Figure 33:
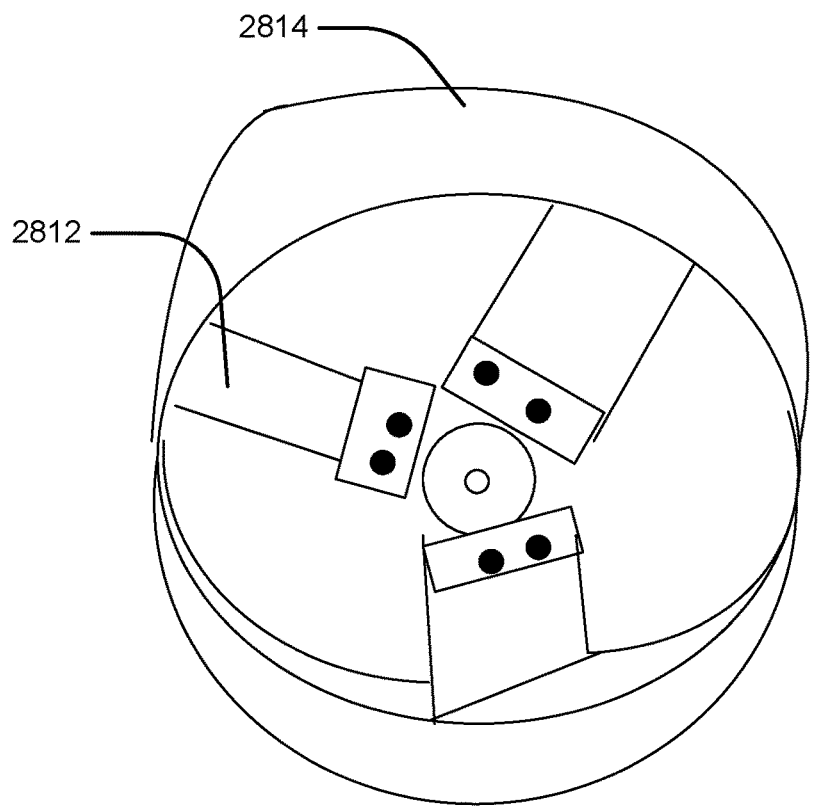
FIG. 33 shows the two-roller nip to which the conveyor feeds stalks.

The brush elements 3006 as shown in FIG. 32 may be formed from plastic cleaning bristles commonly used to clean conveyors. The brush may be driven hydraulically and its speed may be adjustable, but is typically 3-4 times the peripheral speed of the conveyor and nip 3004. FIG. 33 shows nip 2910 formed from rubber-covered rollers which accept the stalks after they pass through the brushes and project them into a receptacle.

Figure 34:
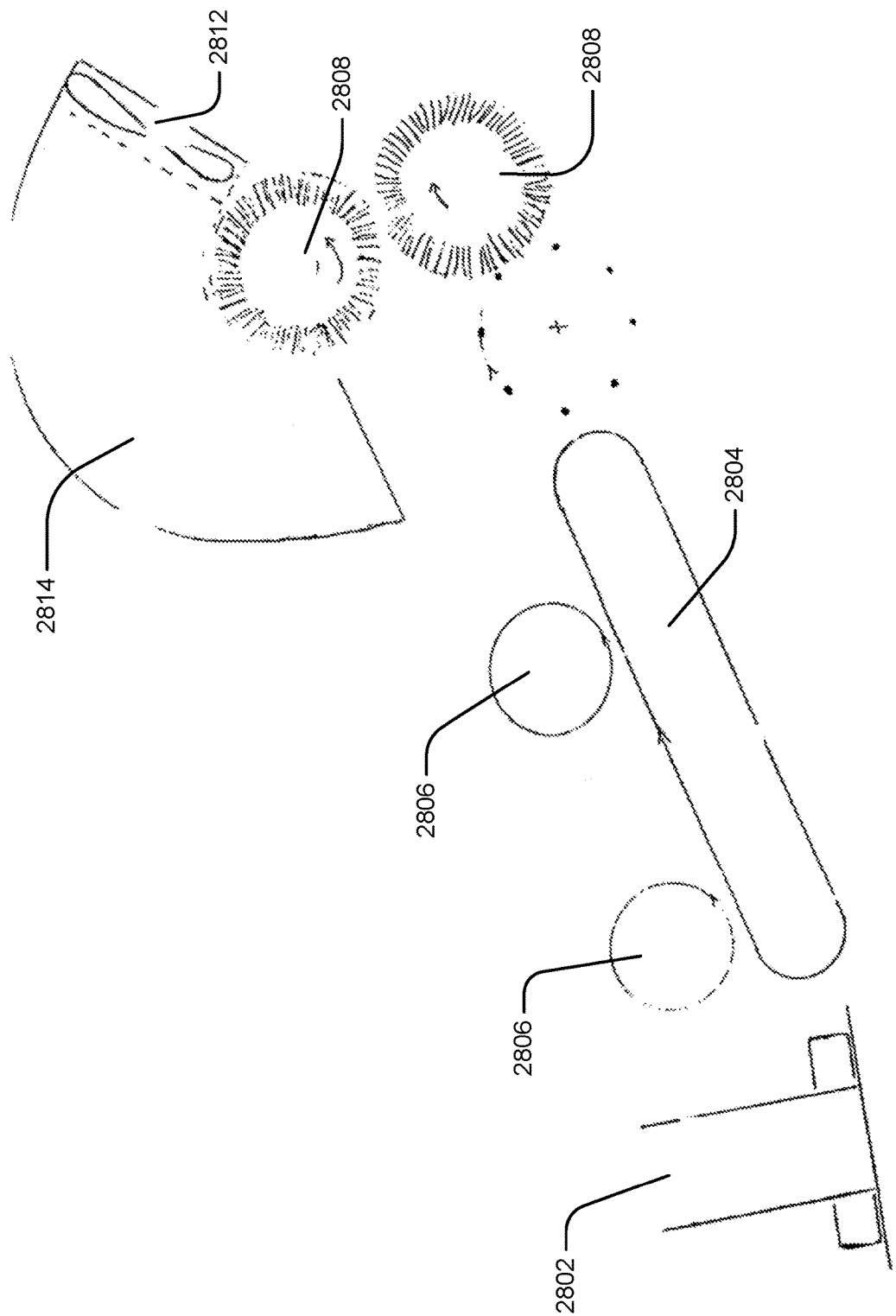
FIG. 34 illustrates an extractor fan.

FIG. 34 shows the extractor fan 2912 and cowling 2914 mounted as in FIGS. 29 and 31. The fan may be hydraulically driven and may be typical of extractor fans used on sugarcane "combine" harvesters.

Figure 35:
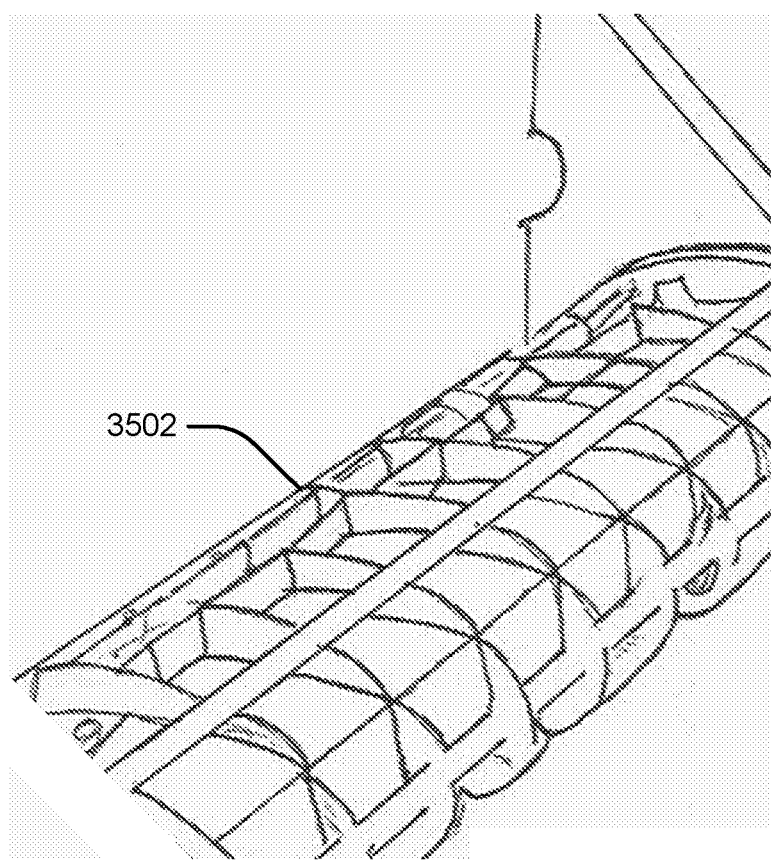
FIG. 35 shows an alternative arrangement where no nip rollers are placed downstream of the brushes.

FIG. 35 shows an alternative arrangement in which there are no nip rollers after the brushes; the brush elements 2908 are envisaged in this case as being of adequate power to project the crop into the receptacle, as well as cleaning off the leaf material.

The novel leaf stripping mechanism uses brushes to sweep leaves off sweet sorghum stalks. The harvester's cleaning device involves the most development as it is being optimized for clean removal of leaves and other trash while minimizing stalk damage. The cleaning brushes are constantly optimized for removal and longer life.

Hurler Drums

A preferred embodiment of a harvester modified with hurler drums typically is fitted with two hurler drums; two rolls (an upper and a lower) of equal diameter located perpendicular to the conveyor belt. Hurler drums finish pulling cane through brush rollers and "hurl" the stalk into the bin and head topper. Proper hurling of the thin sweet sorghum stalks requires hurler drums made of soft sheets of rubber. Guiding plates are configured to the full length of the hurler and for the relative geometry of the hurler, conveyor, and brushes. The rear axle must leave adequate exit for trash due to hurler movement.

The rear axle supports are configured to open up an area to allow access to hurler rollers and brush rollers. This configuration allows for more open space for debris to be directed to the ground and to provide access for maintenance. In using this configuration, it was prudent to reinforce it in another area to keep structural integrity intact. This modification prevents the build up of debris that may impede clearing the debris from the processing of the crop.

Figure 36:
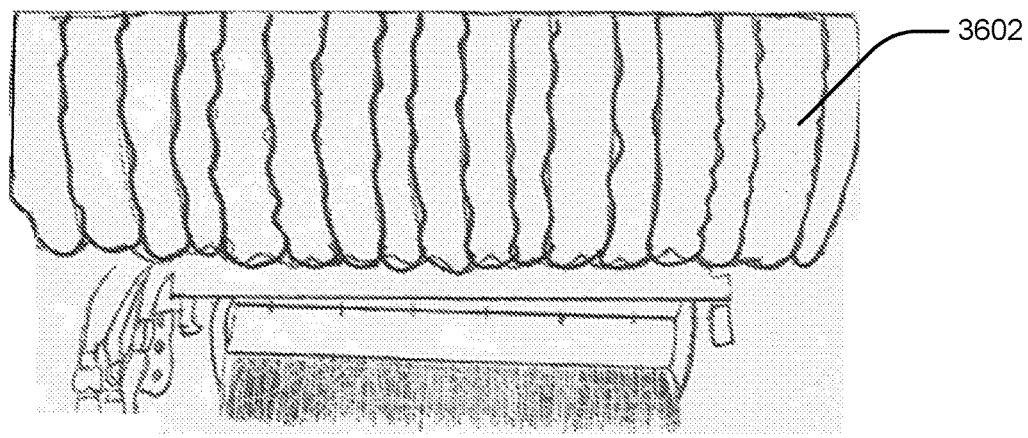
FIG. 36 depicts a lower hurler roller.
Figure 37:
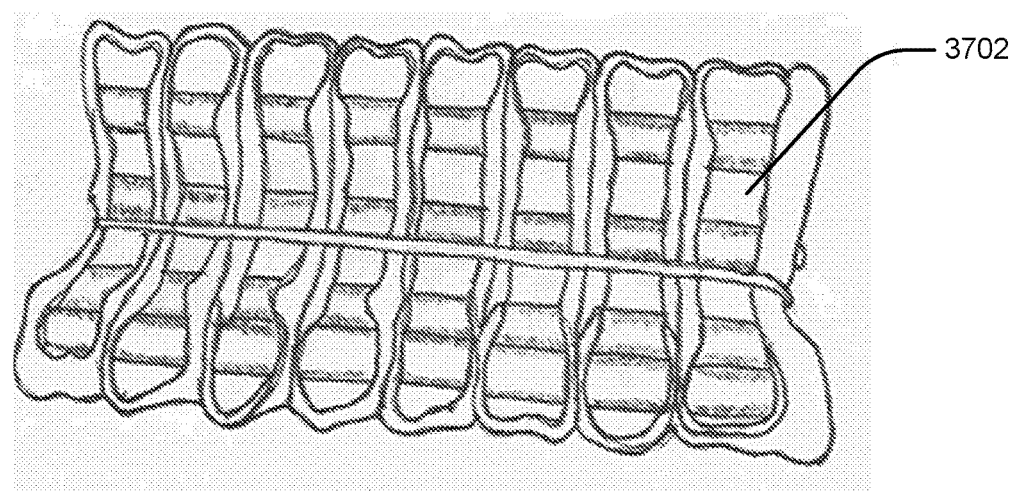
FIG. 37 depicts an upper hurler roller.
Figure 38:
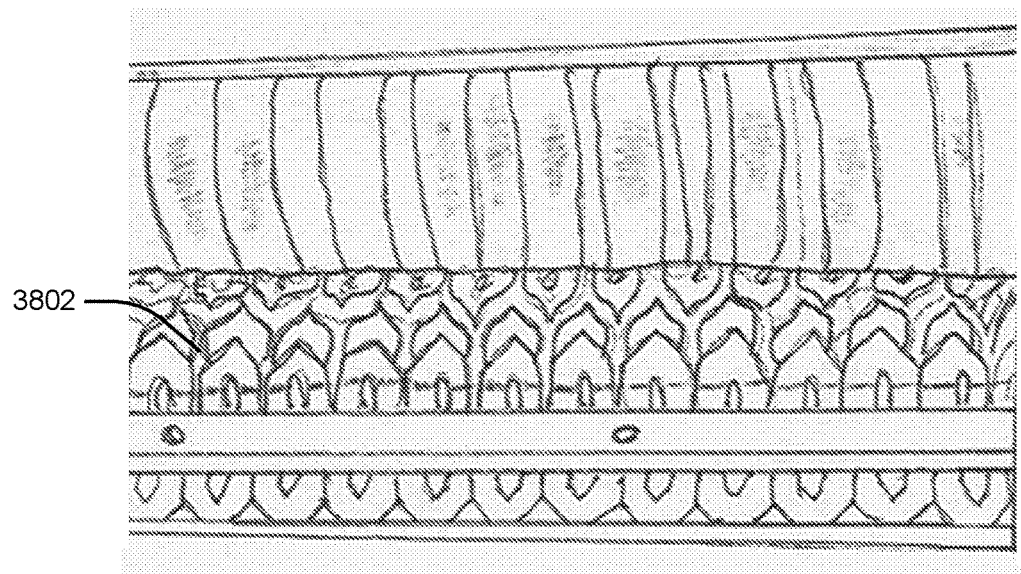
FIG. 38 illustrates the soft rubber wheels of the upper hurler.
Figure 39:
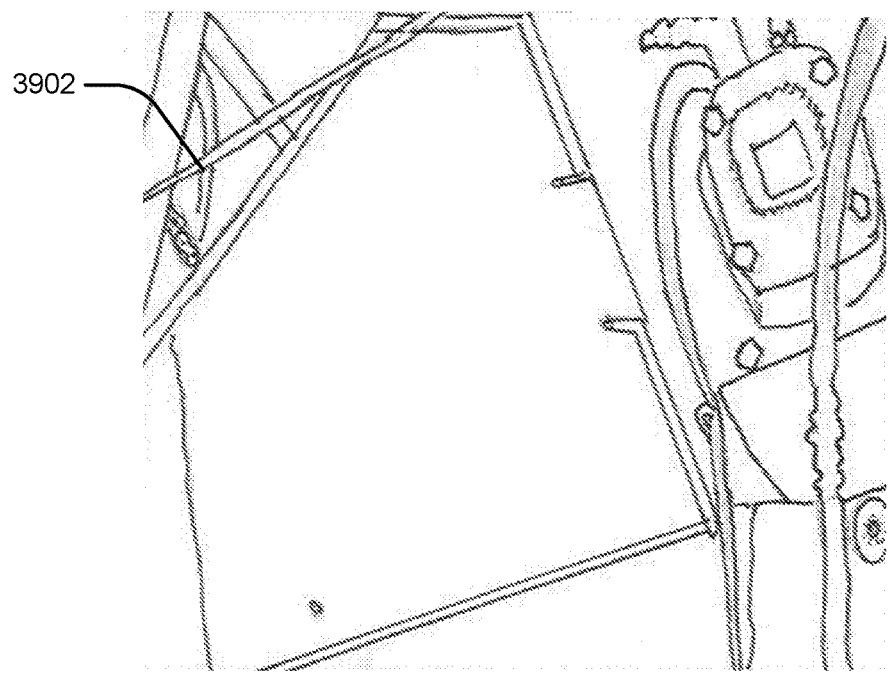
FIG. 39 illustrates the lower hurler with hard rubber tires.

The lower hurler roller, shown in FIG. 36 is configured to allow mounting of the treaded bonded-rubber panels to increase grip on stalks. The top hurler roller provides softer pressure to compensate for the harder lower hurler FIG. 37. Softer tires/rubber panels 3702 are installed on the upper hurler. FIG. 38 illustrates the soft rubber wheels 3802 that will cover the upper hurler roller. The center tires engage special plates in center of the driver structure that are used to space that are used to add some rigidity to the structure and prevent drifting of the tires. The lower hurler in FIG. 39 uses hard tires/rubber 3902 similar to those used on sugar cane harvesters.

Figure 40:
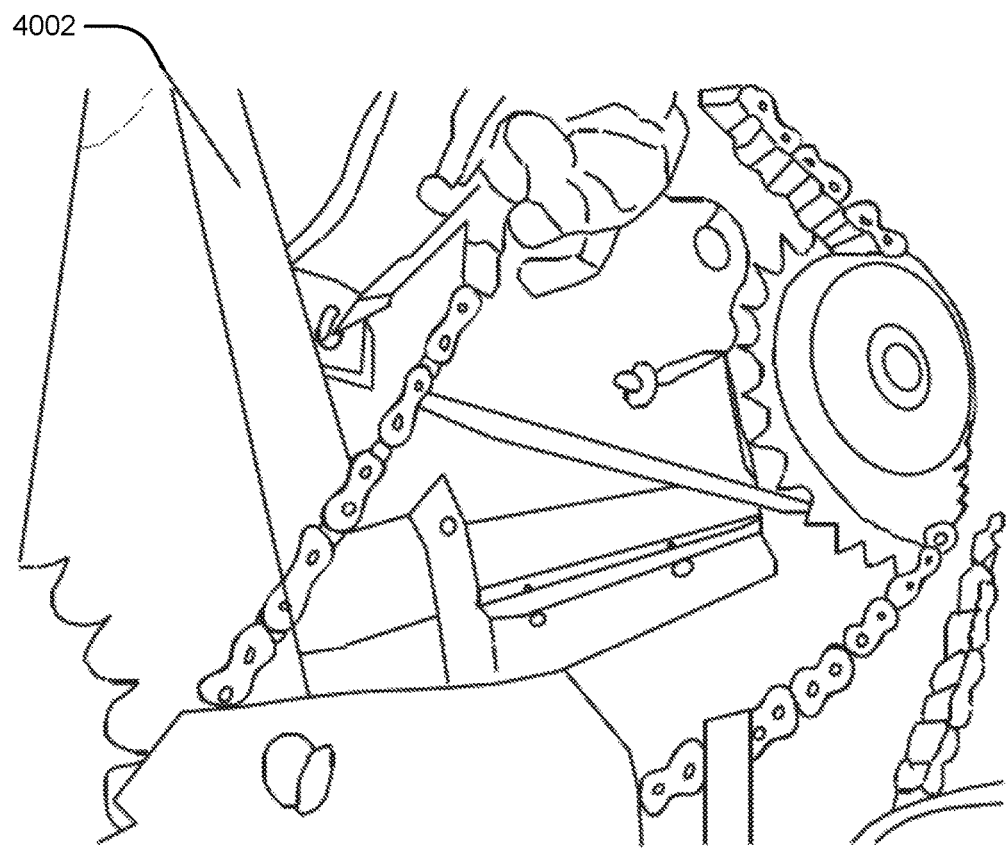
FIG. 40 shows a reworked chain case used to cover the hurler drive.
Figure 41:
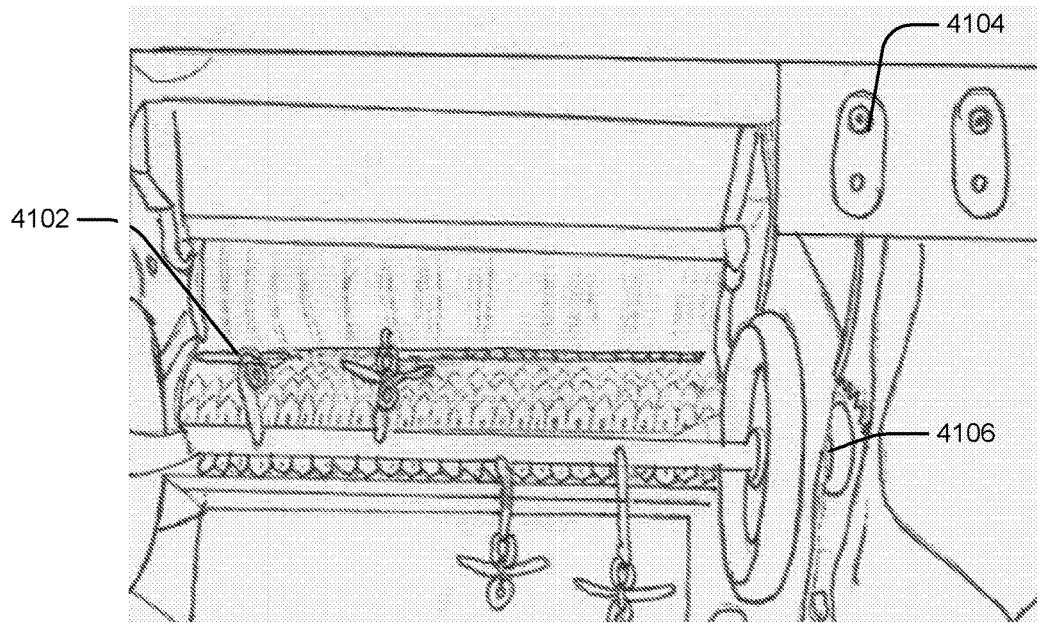
FIG. 41 shows a top hurler pivot and lubrication system.

FIG. 40 shows the reworked chain case 4002 to cover the new drive and give quicker access to hurler drives. FIG. 41 shows repaired top hurler pivots 4102 and devised lubrication system to prevent a wear problem.

De-bridging Flail Roller

Figure 42:
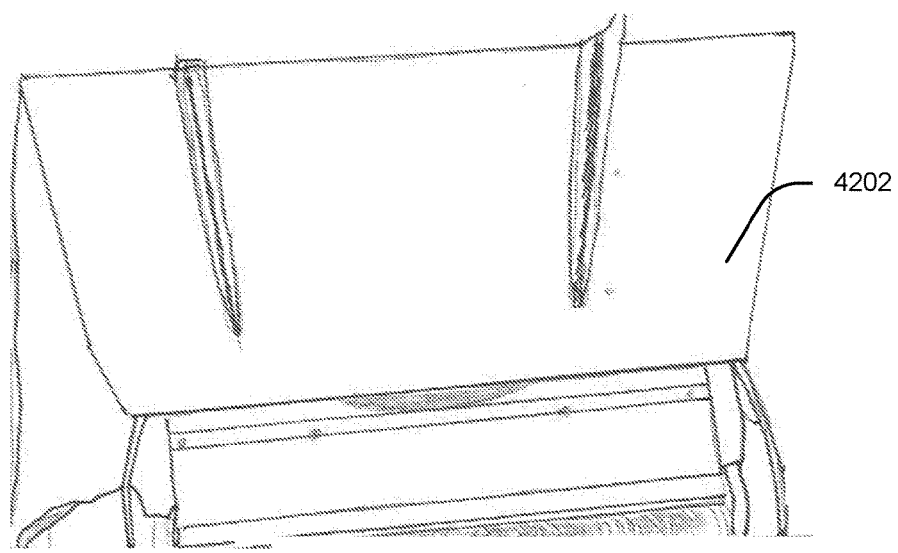
FIG. 42 shows the debridging flail, stabilizing clamps and side breakers.

A de-bridging flail roller with comb fingers and an air blast catches and ejects any remaining trash downwards after the stalk heads are cut. The de-bridging roller may be located just behind the head topper. One construction of a de-bridging thrash roller is a shaft with arms with chain link attached. The roller must be modified for kinder handling and to compensate for modifications made to the air blast. FIG. 42 shows a de-bridging flail 4202, stabilizing clamps 4204 and side breakers 4206.

Air Blast

Figure 43:
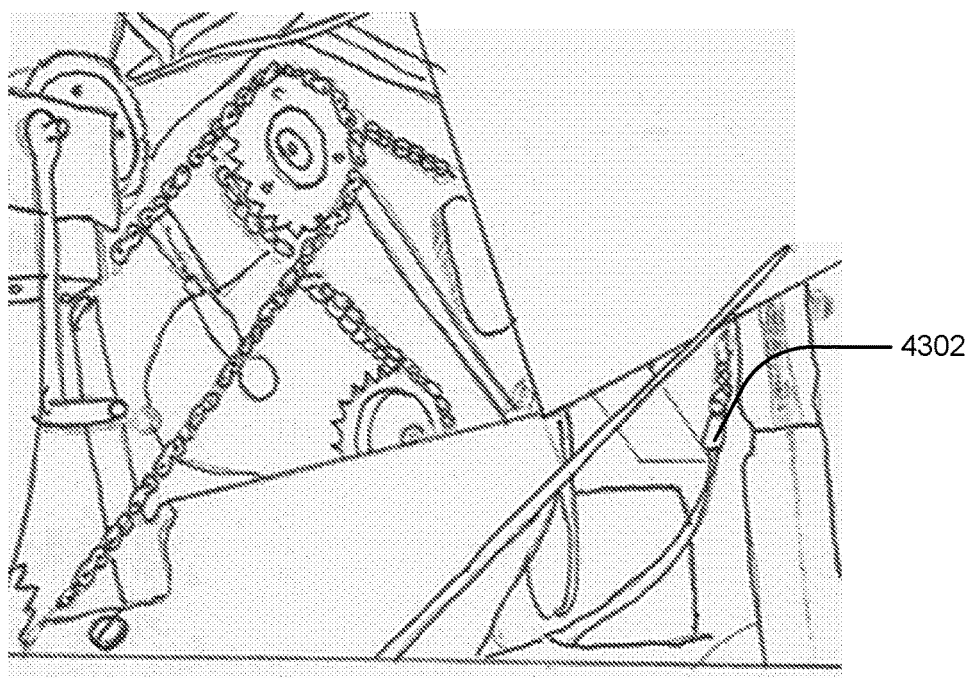
FIG. 43 depicts an air blast deflector.
Figure 44:
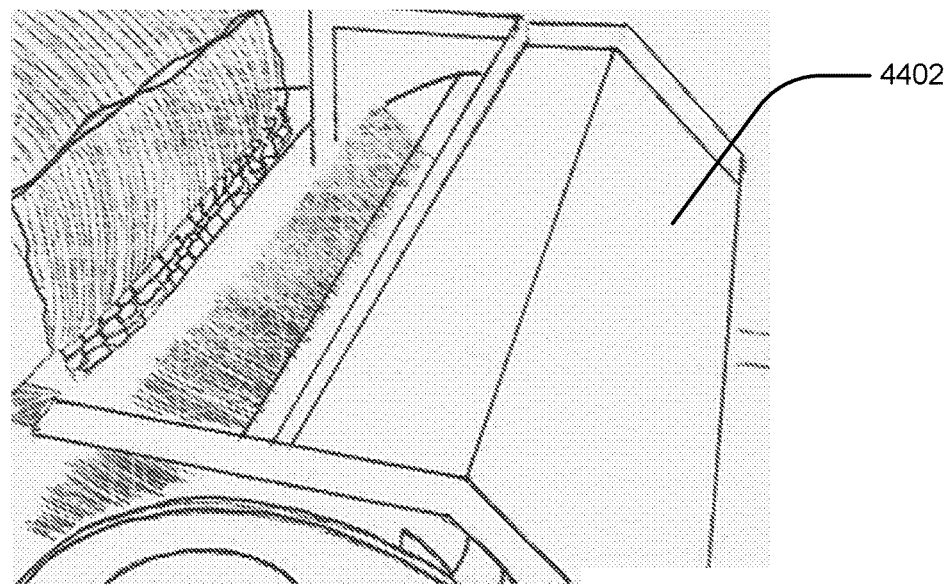
FIG. 44 depicts a hydraulic drive of the fan system.
Figure 45:
FIG. 45 shows the cover for a top brush.
Figure 46:
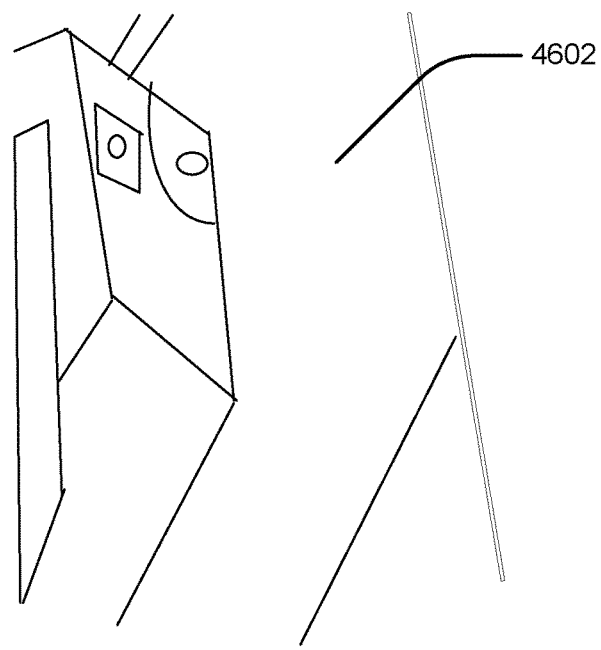
FIG. 46 illustrates the entry of an extractor fan.
Figure 47:
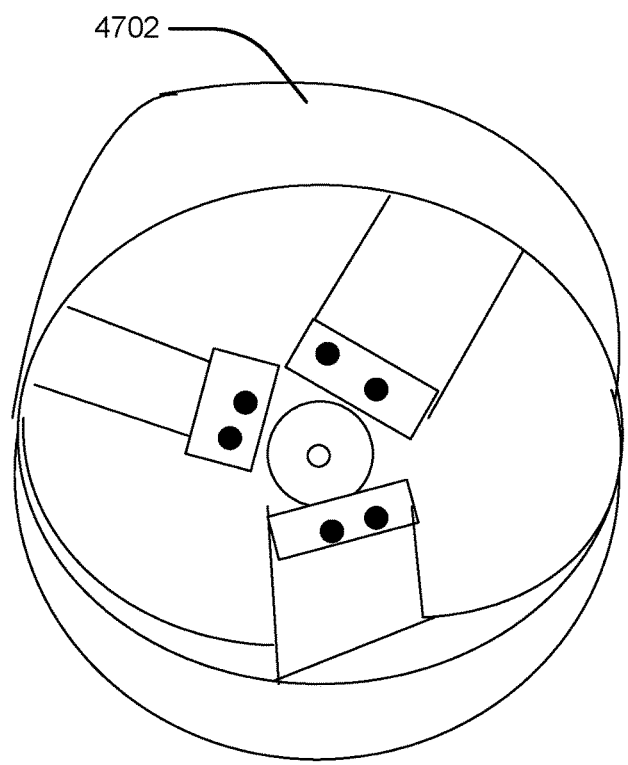
FIG. 47 shows a rubber belting cover linking the top brush area to the fan entry.
Figure 48:
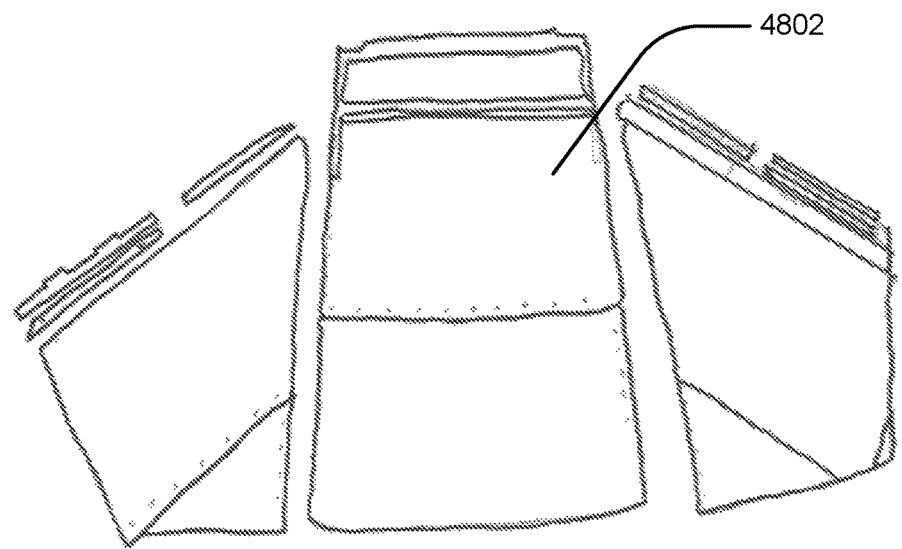
FIG. 48 depicts a fan outlet.
Figure 49:
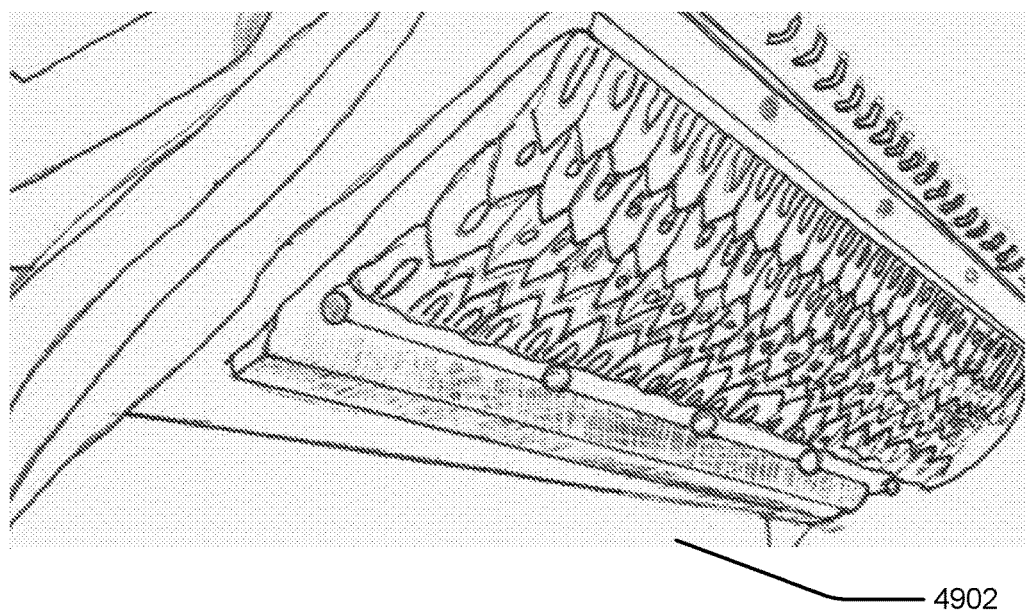
FIG. 49 shows belting attached to a fan.

The air blast, from a fan pulling air near the engine, is directed downwards towards the flail to separate trash from stalks, blowing leaves to the ground. For sweet sorghum harvesting, the air blast must be modified to account for the smaller and lighter leaves of sweet sorghum compared to sugar cane. Shown in FIG. 43, a deflector 4302 pushes leaves into the front part of the bin. The fan may be hydraulically driven 4402, as shown in FIG. 44, with an intake at the brush rollers and output between the hurlers and a de-bridging thrash roller. A chain case covers the drive and gives quick access to the hurler drives. A modified cover for the top brush 4502 shown in FIG. 45 allows leaves to be sucked off by fan. FIG. 46 shows the reworked entry (previously exit) 4602 of extractor fan. FIG. 47 shows the rubber belting 4702 cover linking the top brush area to the fan entry. The cover folds back or easily removes to allow access to engine. FIG. 48 shows the reworked fan outlet 4802. FIG. 49 shows the belting 4902 attached to the fan, prior to installation.

The fan airflow has been reversed so air is blown instead of sucked. The fan has reverse rotation of the blower. The fan assembly is moved back to pull air from just past brush rollers, instead of near the engine, and after deflection blows down in front of the debridging flail. The fan tube structure on top of the machine runs from in back of the engine to the full length of the roller brushes (like a half fender on a bicycle). The inlet pulls above brush roller and expels behind rear hurlers. The fan discharges between the hurlers and the cutter head above the debridging flail. A sheet of plywood deflects air flow to the back side. Rubber belting covers 4902 link the top brush area to the fan entry. The cover folds back or easily removes to allow access to the engine. The air flow is controlled with rubber sheeting to keep air sealed on side above the engine. The loop was closed for suction and the sheeting flipped up for access to the engine during maintenance. The air was pulled through and blown out on top hurlers.

Figure 50:
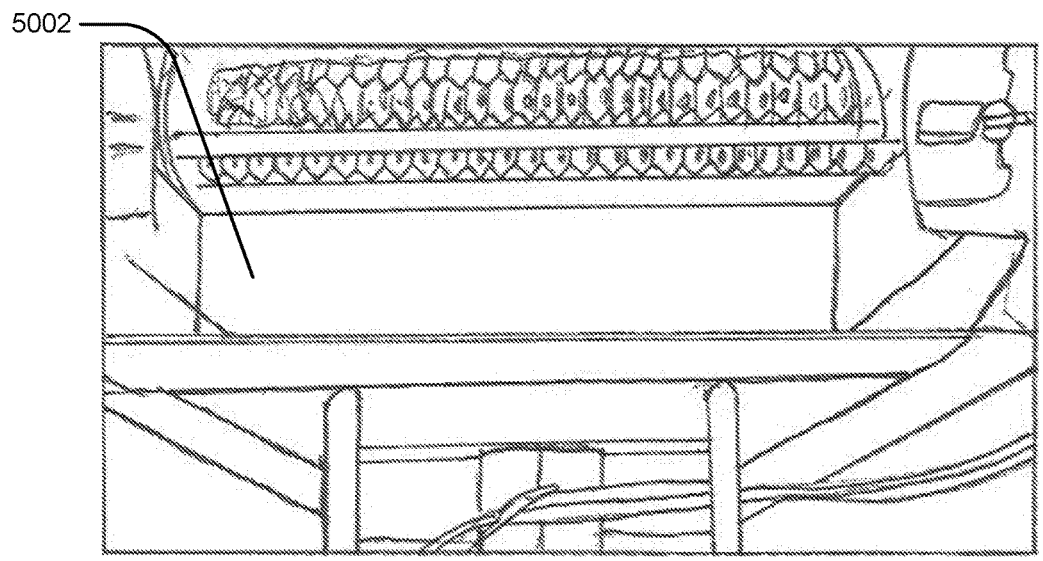
FIG. 50 depicts a front axle support.
Figure 51:
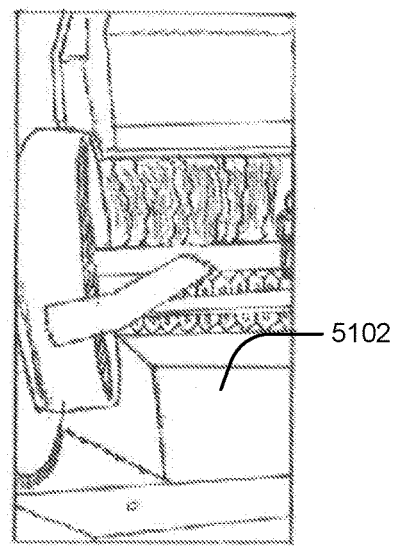
FIG. 51 depicts a rear axle support.
Figure 52:
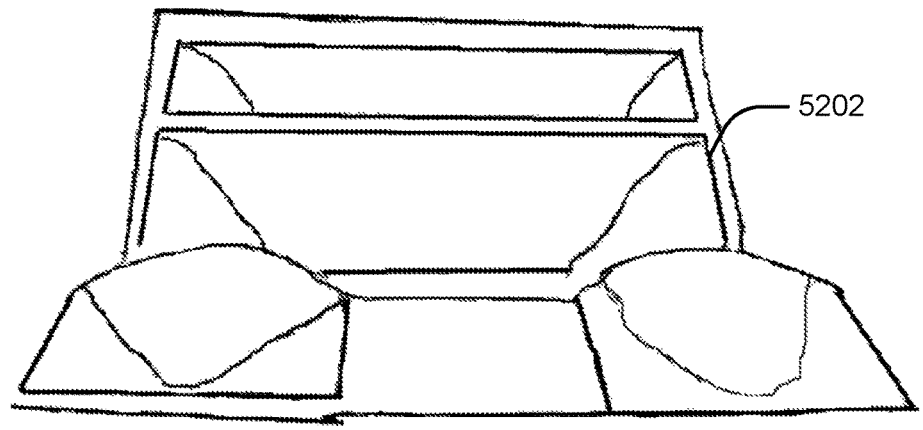
FIG. 52 depicts a axle support system in place.

FIGS. 50 and 51 illustrate the modified axle support in front 5002 and rear 5102 view along with the cover behind the axle, and detail of the corners and cut-off bar. As illustrated in FIG. 52, this structure 5202 may be located below the lower hurler.

Toppers

Figure 53:
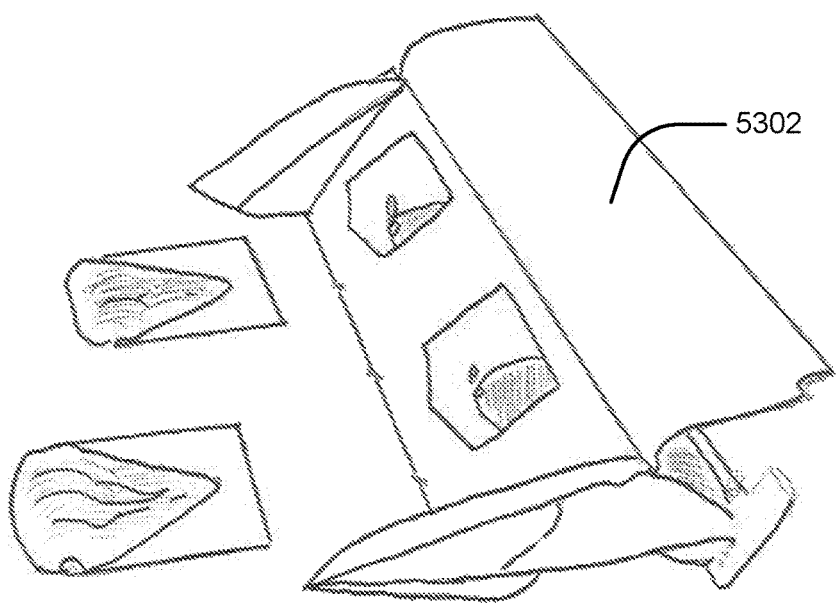
FIG. 53 illustrates a topper unit.
Figure 54:
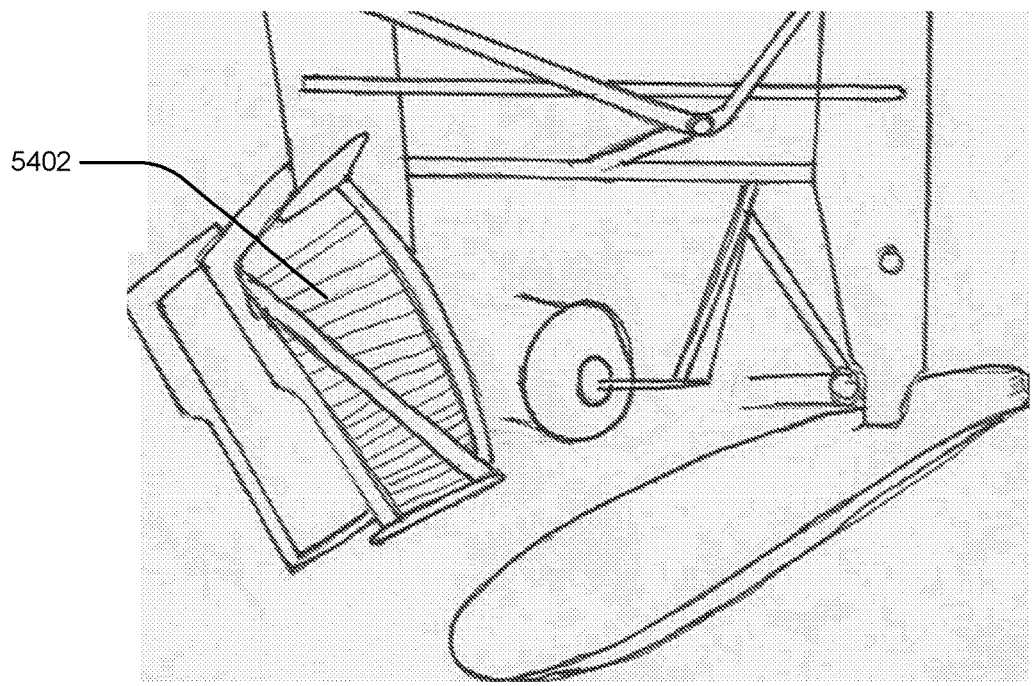
FIG. 54 shows another view of a topper structure.

Two toppers, comprising of a pair of sharp-toothed discs rotating outwards against ledger plates, sever the tops of the stalk to length and remove the valuable grain heads from the stalk. Toppers are made adjustable fore and aft to accommodate varying stalk heights and desired cutting length of head and stalk. The topper must be modified to account for the smaller and much different tops (grain heads) compared to sugar cane tops. FIG. 53 shows the topper unit 5302 adjusted back into the bin and re-hosed from below to permit free movement. The fan was moved to make room for the topper. A rubber sheet may be mounted in front to form separate piles of crop components. The topper structure 5402 is shown in FIG. 54. To accommodate the bin extension, the topper may be moved back. A reason for this change is that cane tops are leaves, considered trash that are blown onto the field while sweet sorghum tops are valuable grain seeds.

Bin

Figure 55:
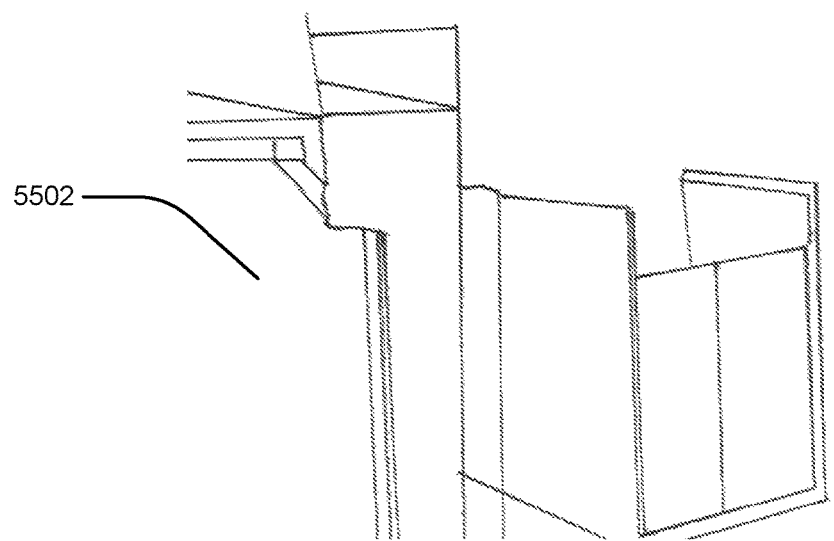
FIG. 55 shows a bin frame.
Figure 56:
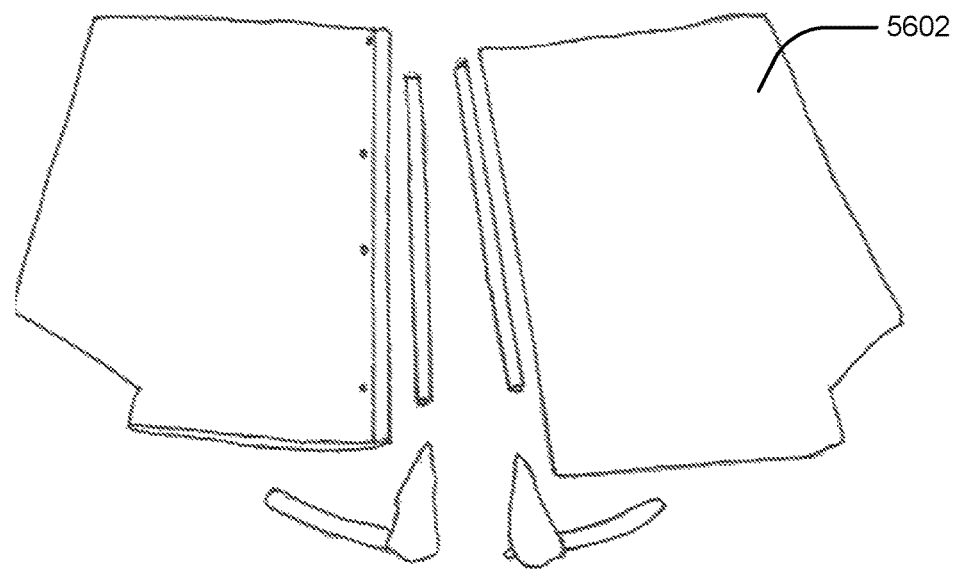
FIG. 56 depicts the telescope section of a bin before installation.
Figure 57:
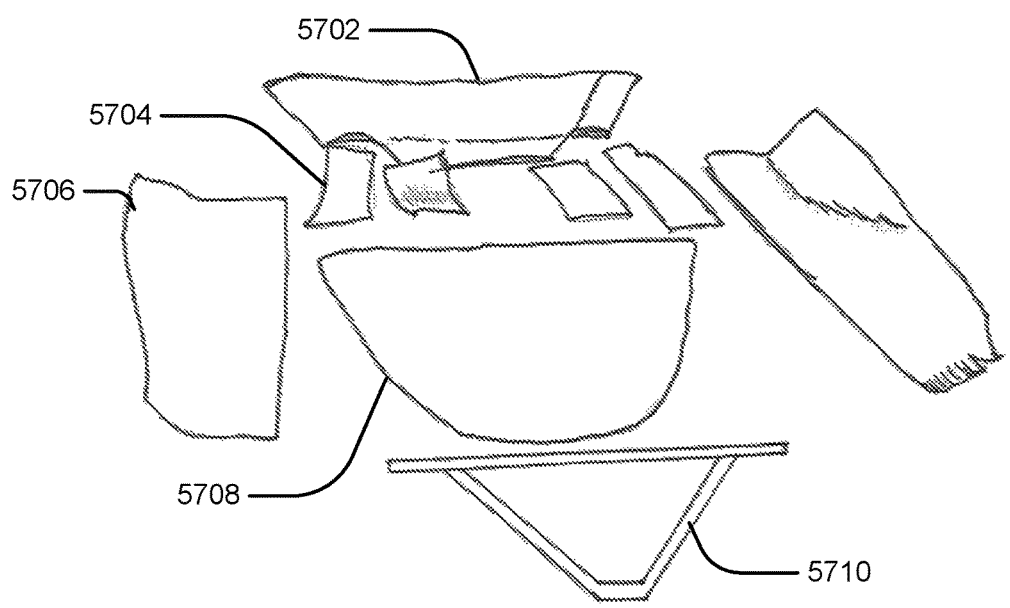
FIG. 57 depicts bin sidings.
Figure 58:
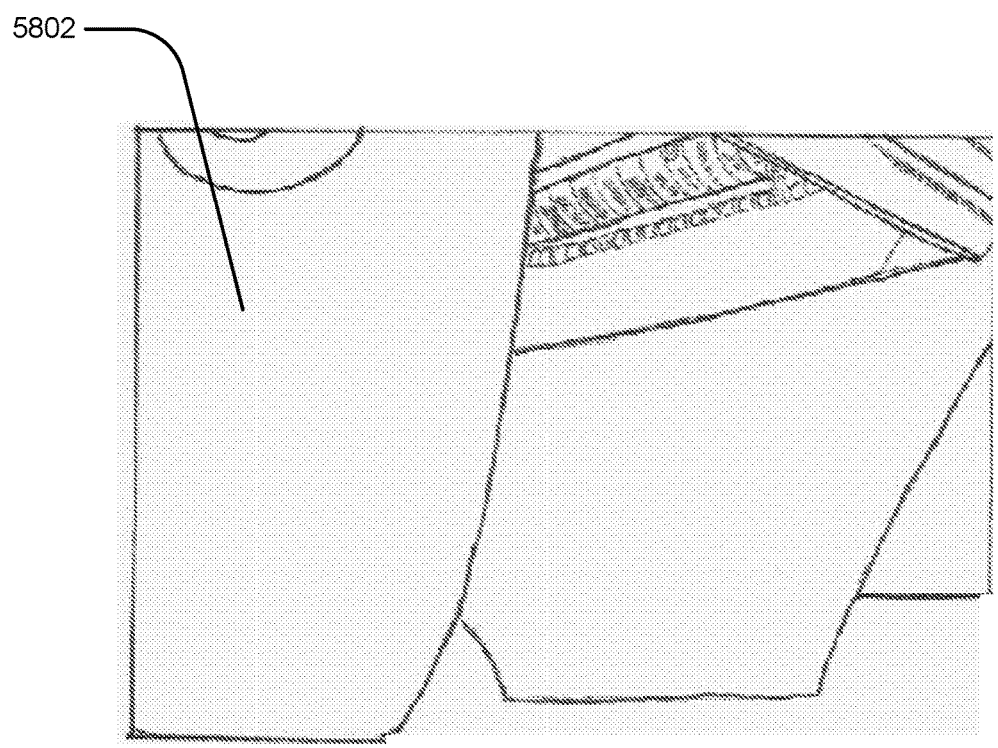
FIG. 58 shows a bin structure in context.
Figure 59:
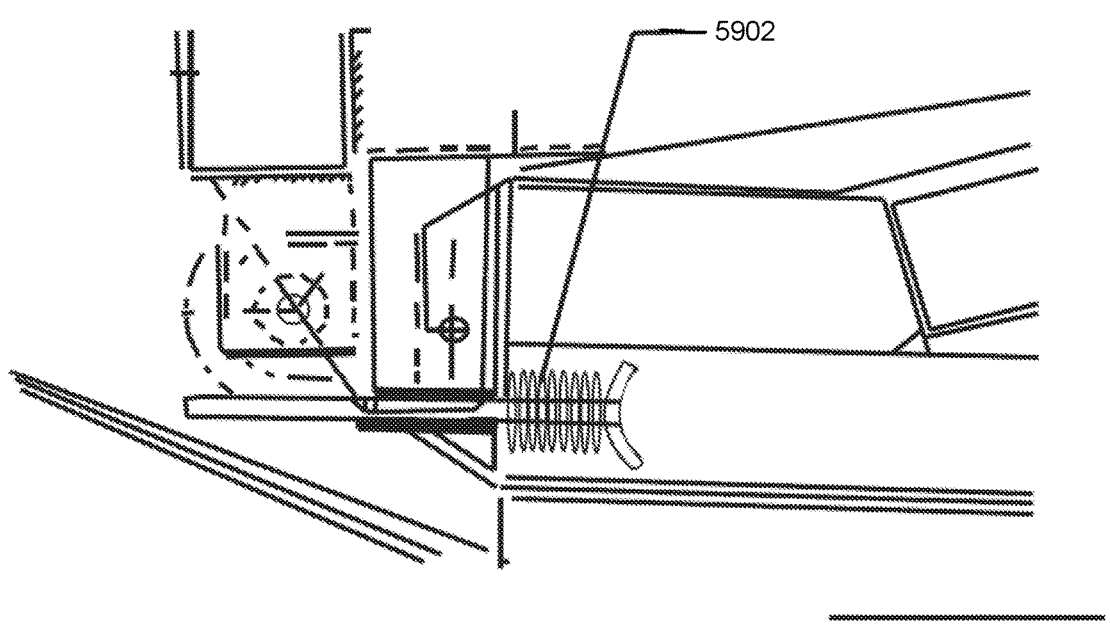
FIG. 59 depicts rubber sheeting that may be used to separate a bin into sections.
Figure 60A:
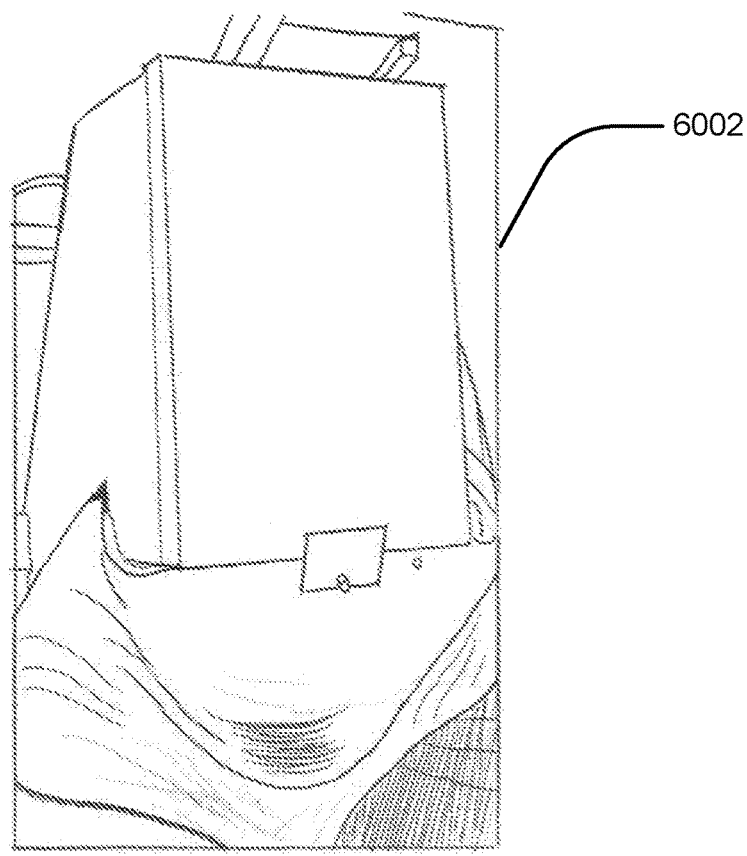
FIG. 60 illustrates a cushion used to support bin doors.
Figure 60B:
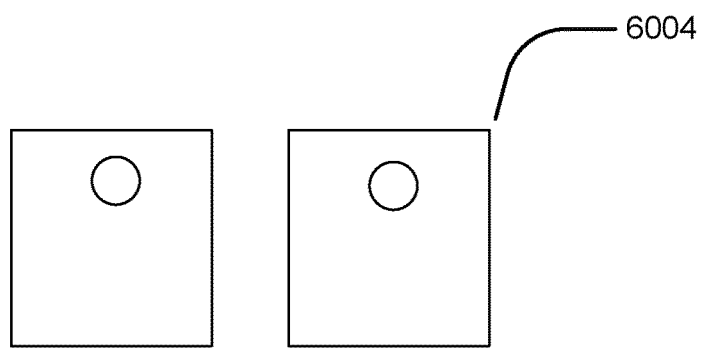

The bin is the storage area at the rear of the machine; it accumulates and discharges the stalks and leaves into piles. It may be split to collect two separate piles of stalks, used for ethanol processing, at the back of the bin and leaves and heads, used for silage animal feed, at the front of the bin. Alternatively, only the stalks, used for ethanol processing, and heads, used for grain feed, could be collected in the two separate sections of the bin with the leaves blown onto the field. Or the bin could be separated into three sections with the leaves collected separately from the heads, for use as fuel for the process offseason, while the stalks are used for ethanol processing and the heads are used for grain feed. The bin of a sugar cane harvester must be modified to account for longer and thinner stalks of sweet sorghum compared to sugar cane. FIG. 55 shows the bin frame extended with a bin extension 5502 to allow for collection of 12 to 13 foot stalks. FIG. 56 shows the telescope section of the bin 5602 completely remodeled to allow 12 foot stalks and increase capacity. FIG. 57 shows new sidings 5702 for the front of the bin. FIG. 58 shows the axle cover 5802, sidings to the topper track 5804, bin door extensions 5806 and mid-bin rubber sheet and support 5808. FIG. 59 shows the rubber sheet 5902 that separates the front and rear parts of bin. The bin is typically equipped with operator controlled doors for dropping harvested sorghum into piles on the ground. A cushion 6002, shown in FIG. 60, may be used to replace rollers supporting the bin doors to stop banging of the door when the row direction is changed. The bin may adjust in length to the height of the stalk, to cut the seed head from the stalk to length as the height of the crop changes. A cable is extended from the back of the bin to the cab window so the driver can use the height of the stalks to set the length of the bin and toppers. When the butts of the stalks hit the back of the bin and fall on the topper, the tops are separated into the front part of the bin and the stalks to the back.

Figure 61:
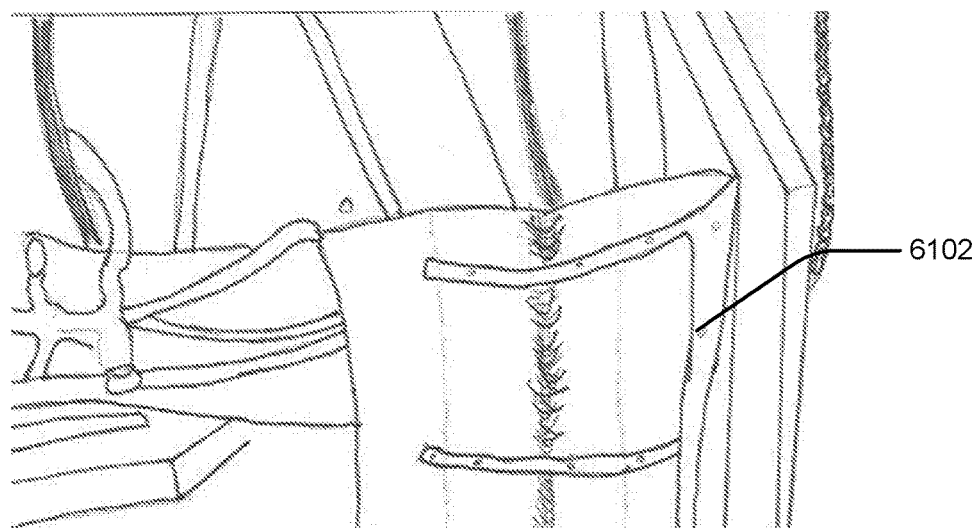
FIG. 61a shows the catch-rubber and FIG. 61b shows the weight that keeps the catch-rubber forward.
Figure 62:
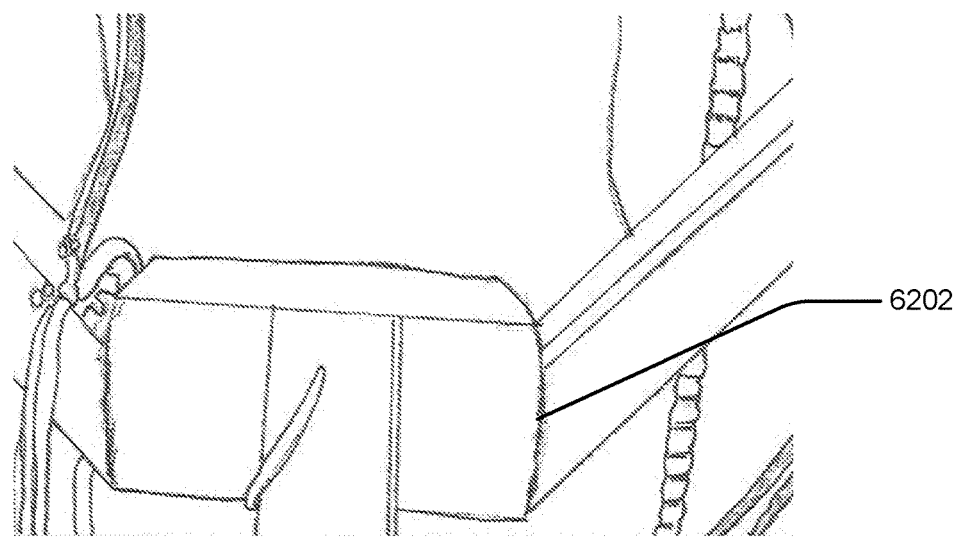
FIG. 62 shows extensions to the doors for the special front compartment.

FIG. 61 depicts the catch rubber (FIG. 61*a* 6102) and the weight (FIG. 61*b* 6104) that keeps the catch-rubber forward in for the first few stalks. FIG. 62 shows extensions to the doors 6202 for the special front compartment. FIG. 63 shows the main axel beam area 6302, which was reworked (again) to improve access to the conveyor, hurler, and brushes, including by mounting a big cross-tube.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the harvesting system that are organized or designed differently while maintaining substantially the same functionality without departing from the scope and spirit of the present invention.

What is claimed is:

1. A sugar crop harvester de-leafing apparatus, comprising:
 a feed conveyor with a pressure roll used to convey stalks through the de-leafing apparatus, the feed conveyor further comprising nips that restrain the stalks from moving at the same speed as the feed conveyor;
 an upper and a lower rotating brush roll element located at the end of the feed conveyor, the brush roll elements are configured to rotate in the direction of the conveyor at a relatively greater speed than the speed of the stalks being conveyed on the feed conveyor, wherein the brush roll elements sweep the leaves from the stalks;
 a means of restraining stalks so they cannot be accelerated by the brush roll elements; and
 an extractor fan to remove the freed leaf material and project the freed leaf material forcibly onto the stalks to add to the cleaning of the stalks and to dispose of the leaf material directly under the machine.

2. The sugar crop harvester de-leafing apparatus of claim 1 whereby the brush roll elements are vertically oriented.

3. The sugar crop harvester de-leafing apparatus of claim 1 further comprising a set of hurler drums to propel the stalks into a bin and head topper to remove seed head tops of a sorghum stalk;
 a de-bridging flail roller with comb fingers and an air blast to catch and eject any trash after stalk seed heads are cut;
 a catch bin to accumulate and discharge cane into piles.

4. The sugar crop harvester de-leafing apparatus of claim 1 further comprising a feed roller located in the center of the conveyor to increase the surface area of stalks being fed into the brush roll elements.

* * * * *